(12) United States Patent
Stam et al.

(10) Patent No.: US 7,565,006 B2
(45) Date of Patent: Jul. 21, 2009

(54) IMAGE ACQUISITION AND PROCESSING METHODS FOR AUTOMATIC VEHICULAR EXTERIOR LIGHTING CONTROL

(75) Inventors: Joseph S. Stam, Holland, MI (US); Gregory A. Mart, Zeeland, MI (US); Keith H. Berends, Hudsonville, MI (US); Gregory S. Bush, Grand Rapids, MI (US); John K. Roberts, East Grand Rapids, MI (US); Mark W. Pierce, Grandville, MI (US); Jon H. Bechtel, Holland, MI (US); Eric J. Walstra, Grand Rapids, MI (US); Brock R. Rycenga, Wyoming, MI (US)

(73) Assignee: Gentex Corporation, Zeeland, MI (US)

( * ) Notice: Subject to any disclaimer, the term of this patent is extended or adjusted under 35 U.S.C. 154(b) by 880 days.

(21) Appl. No.: 10/645,801

(22) Filed: Aug. 20, 2003

(65) Prior Publication Data

US 2004/0143380 A1 Jul. 22, 2004

Related U.S. Application Data

(60) Provisional application No. 60/404,879, filed on Aug. 21, 2002.

(51) Int. Cl.
*G06K 9/02* (2006.01)
*G05B 13/02* (2006.01)
*G06E 1/00* (2006.01)
*B60Q 1/02* (2006.01)

(52) U.S. Cl. .......................... 382/155; 700/47; 706/15; 315/82

(58) Field of Classification Search ................ 382/104, 382/155–159; 315/82; 250/214; 340/901
See application file for complete search history.

(56) References Cited

U.S. PATENT DOCUMENTS

| 2,632,040 | A | 3/1953 | Rabinow |
| 2,827,594 | A | 3/1958 | Rabinow |
| 4,139,801 | A | 2/1979 | Linares |
| 4,236,099 | A | 11/1980 | Rosenblum |
| 4,357,558 | A | 11/1982 | Massoni et al. |
| 4,376,909 | A | 3/1983 | Tagami et al. |
| 4,599,544 | A | 7/1986 | Martin |
| 4,665,321 | A | 5/1987 | Chang et al. |
| 4,692,798 | A | 9/1987 | Seko et al. |

(Continued)

FOREIGN PATENT DOCUMENTS

DE 2946561 A1 5/1981

(Continued)

OTHER PUBLICATIONS

"Learned Classification of Sonar Targets Using a Massively Parallel Network" by Gorman et al. Acoustics, Speech, and Signal Processing [see also IEEE Transactions on Signal Processing], IEEE Transactions on, vol. 36, Issue: 7, Jul. 1988.*

*Primary Examiner*—Charles Kim
(74) *Attorney, Agent, or Firm*—James E. Shultz, Jr.

(57) ABSTRACT

The present invention relates to various apparatus, algorithms and methods for acquiring and processing images of a scene. Details of various aspects of the associated images are identified and may be utilized to generate various vehicular equipment control signals.

19 Claims, 22 Drawing Sheets

U.S. PATENT DOCUMENTS

| | | | |
|---|---|---|---|
| 4,727,290 A | 2/1988 | Smith et al. | |
| 4,768,135 A | 8/1988 | Kretschmer et al. | |
| 4,862,037 A | 8/1989 | Farber et al. | |
| 4,891,559 A | 1/1990 | Matsumoto et al. | |
| 4,917,477 A * | 4/1990 | Bechtel et al. | 359/267 |
| 4,930,742 A | 6/1990 | Schofield et al. | |
| 4,967,319 A | 10/1990 | Seko | |
| 5,036,437 A | 7/1991 | Macks | |
| 5,072,154 A | 12/1991 | Chen | |
| 5,086,253 A | 2/1992 | Lawler | |
| 5,124,549 A | 6/1992 | Michaels et al. | |
| 5,136,507 A * | 8/1992 | Shiraishi et al. | 701/41 |
| 5,182,502 A | 1/1993 | Slotkowski et al. | |
| 5,187,383 A | 2/1993 | Taccetta et al. | |
| 5,235,178 A | 8/1993 | Hegyi | |
| 5,329,206 A | 7/1994 | Slotkowski et al. | |
| 5,416,318 A | 5/1995 | Hegyi | |
| 5,426,294 A | 6/1995 | Kobayashi et al. | |
| 5,434,407 A | 7/1995 | Bauer et al. | |
| 5,451,822 A | 9/1995 | Bechtel et al. | |
| 5,471,515 A | 11/1995 | Fossum et al. | |
| 5,508,592 A | 4/1996 | Lapatovich et al. | |
| 5,537,003 A | 7/1996 | Bechtel et al. | |
| 5,550,677 A | 8/1996 | Schofield et al. | |
| 5,614,788 A | 3/1997 | Mullins et al. | |
| 5,660,454 A | 8/1997 | Mori et al. | |
| 5,666,028 A | 9/1997 | Bechtel et al. | |
| 5,715,093 A | 2/1998 | Schierbeek et al. | |
| 5,796,094 A | 8/1998 | Schofield et al. | |
| 5,811,888 A | 9/1998 | Hsieh | |
| 5,812,321 A | 9/1998 | Schierbeek et al. | |
| 5,837,994 A | 11/1998 | Stam et al. | |
| 5,841,126 A | 11/1998 | Fossum et al. | |
| 5,912,534 A | 6/1999 | Benedict | |
| 5,923,027 A | 7/1999 | Stam et al. | |
| 5,942,853 A | 8/1999 | Piscart | |
| 5,990,469 A | 11/1999 | Bechtel et al. | |
| 6,008,486 A | 12/1999 | Stam et al. | |
| 6,049,171 A | 4/2000 | Stam et al. | |
| 6,097,023 A | 8/2000 | Schofield et al. | |
| 6,130,421 A | 10/2000 | Bechtel et al. | |
| 6,144,158 A | 11/2000 | Beam | |
| 6,393,133 B1 * | 5/2002 | Breed et al. | 382/100 |
| 6,396,397 B1 | 5/2002 | Bos et al. | |
| 6,406,172 B1 | 6/2002 | Hareers et al. | |
| 6,442,465 B2 | 8/2002 | Breed et al. | |
| 2002/0040962 A1 | 4/2002 | Schofield et al. | |
| 2004/0032981 A1 * | 2/2004 | Ii et al. | 382/159 |

FOREIGN PATENT DOCUMENTS

| | | |
|---|---|---|
| EP | 1330132 A2 | 7/2003 |
| FR | 2641237 A1 | 7/1990 |
| FR | 2726144 A1 | 4/1996 |
| JP | 7-47878 | 2/1995 |
| JP | 7-69125 | 3/1995 |
| JP | 8-166221 | 6/1996 |
| WO | WO 8605147 | 9/1986 |
| WO | WO 9735743 | 10/1997 |
| WO | WO 9843850 | 10/1998 |
| WO | WO 9947396 | 9/1999 |
| WO | WO 0022881 | 4/2000 |
| WO | WO 03045734 A1 | 6/2003 |

* cited by examiner

Fig. 9b ge[x, in9s[8:0]]

| glog[5:0] | Encoding for gray code |
|---|---|
| glog[0] | (ge[1] and not ge[3] ) or<br>(ge[5] and not ge[7] ) or<br>(ge[9] and not ge[11]) or<br>(ge[13] and not ge[15]) or<br>(ge[17] and not ge[19]) or<br>(ge[21] and not ge[23]) or<br>(ge[25] and not ge[27]) or<br>(ge[29] and not ge[31]) or<br>(ge[33] and not ge[35]) or<br>(ge[37] and not ge[39]) or<br>(ge[41] and not ge[43]) or<br>(ge[45] and not ge[47]) |
| glog[1] | (ge[2] and not ge[6]) or<br>(ge[10] and not ge[14]) or<br>(ge[18] and not ge[22]) or<br>(ge[26] and not ge[30]) or<br>(ge[34] and not ge[38]) or<br>(ge[42] and not ge[46]) |
| glog[2] | (ge[4] and not ge[12]) or<br>(ge[20] and not ge[28]) or<br>(ge[36] and not ge[44]) |
| glog[3] | (ge[8] and not ge[24]) or<br>(ge[40]) |
| glog[4] | ge[16] |
| glog[5] | ge[32] |

~909 glog[5:0]

| log[5:0] | Encoding for binary |
|---|---|
| log[5] | glog[5] |
| log[4] | log[5] xor glog[4] |
| log[3] | log[4] xor glog[3] |
| log[2] | log[3] xor glog[2] |
| log[1] | log[2] xor glog[1] |
| log[0] | log[1] xor glog[0] |

~910 log[5:0]

IMAGE ACQUISITION AND PROCESSING METHODS FOR AUTOMATIC VEHICULAR EXTERIOR LIGHTING CONTROL

CROSS-REFERENCE TO RELATED APPLICATIONS

This application claims priority under 35 U.S.C. 119(e) to provision U.S. Patent Application Ser. No. 60/404,879, entitled "IMAGE ACQUISITION AND PROCESSING METHOD FOR VEHICULAR LIGHTING CONTROL," filed on Aug. 21, 2002, Joseph S. Stam et al. The disclosure of which is hereby incorporated in its entirety by reference.

BACKGROUND OF THE INVENTION

It has long been desirable to provide automatic control of vehicle lighting both to improve driving safety and provide convenience for the driver. Such automatic lighting control may include automatic activation and deactivation of a controlled vehicle's high beam headlights as a function of driving conditions. This function has been widely attempted using various types of optical sensors to detect the ambient lighting conditions, the head lamps of oncoming vehicles and the tail lamps leading vehicles. Most recently, sensors utilizing an electronic image sensor have been proposed. Such systems are disclosed in commonly assigned U.S. Pat. No. 5,837,994 entitled Control system to automatically dim vehicle head lamps and U.S. Pat. No. 6,049,171 entitled Continuously variable headlamp control and commonly assigned U.S. patent application Ser. No. 09/799,310 entitled Image Processing System to control Vehicle Headlamps or other Vehicle Equipment, Ser. No. 09/528,389 entitled Improved Vehicle Lamp Control, and Ser. No. 09/800,460 entitled System for Controlling Exterior Vehicle Lights. The disclosures of each of these documents are incorporated in their entireties herein by reference. Light source detection within image sensing presents many challenges. For example, it may be difficult to discriminate between oncoming vehicle head lamps and reflections of the controlled vehicle's head lamps off of signs or other objects. Additionally, it may be difficult to detect distant tail lamps in proximity of other light sources, such as overhead street lamps for example, because these light sources may blur together in the image diluting the red color of the tail lamps.

Some of these problems may be solved by higher resolution imaging systems. However, construction of such a system requires a more expensive image sensor, a high quality lens, more processing power and more memory which, at the present time, would be cost prohibitive. Further more, not all of the problems with currently disclosed systems are likely to be solved with increased resolution alone, even disregarding economics.

The present invention seeks to overcome the limitations of the prior art by providing improved methods of acquiring and analyzing images from an image sensor for the purpose of detecting the head lamps of oncoming vehicles and tail lamps of leading vehicles and for discriminating these light sources from other sources of light within an image. The information obtained by the apparatus and methods disclosed herein may be used to automatically control vehicle equipment, such as controlling a controlled vehicle's exterior lights, windshield wipers, defroster, or for other purposes.

SUMMARY OF THE INVENTION

In at least one embodiment of the present invention, an apparatus for acquiring images of a scene is provided. In a related embodiment, an apparatus for processing and storing the related information is provided. Additionally, a low-voltage differential signal device with a memory buffer is provided for interface of an imager to a microprocessor.

In at least one embodiment, a high dynamic range image is synthesized to accommodate the diverse brightness levels associated with the various light sources anticipated to be present in the associated field of view of the imager.

In at least one embodiment, a peak detect algorithm is employed to detect individual light sources. The peak detect algorithms disclosed provide a means to separately detect light sources that are very close together and, or, partially overlapping.

In at least one embodiment, light source classification algorithms are employed to identify light sources that induce system responses. A host of classification algorithms incorporating probability functions and, or, neural networks are disclosed.

In at least one embodiment, switching methods are employed for automatically varying the operation of exterior vehicle lights. Various techniques for controlling both bi-modal, substantially continuously variable and continuously variable lights are disclosed.

Training routines are provided in at least one embodiment for calibration of the classification algorithms. Empirical, experimental, real time and statistical data may be used individually, or in various combinations, to facilitate training.

BRIEF DESCRIPTION OF THE DRAWINGS

FIGS. 9a and 9b depict stepwise representation of a data compression algorithm;

DETAILED DESCRIPTION OF THE INVENTION

Figure 1:
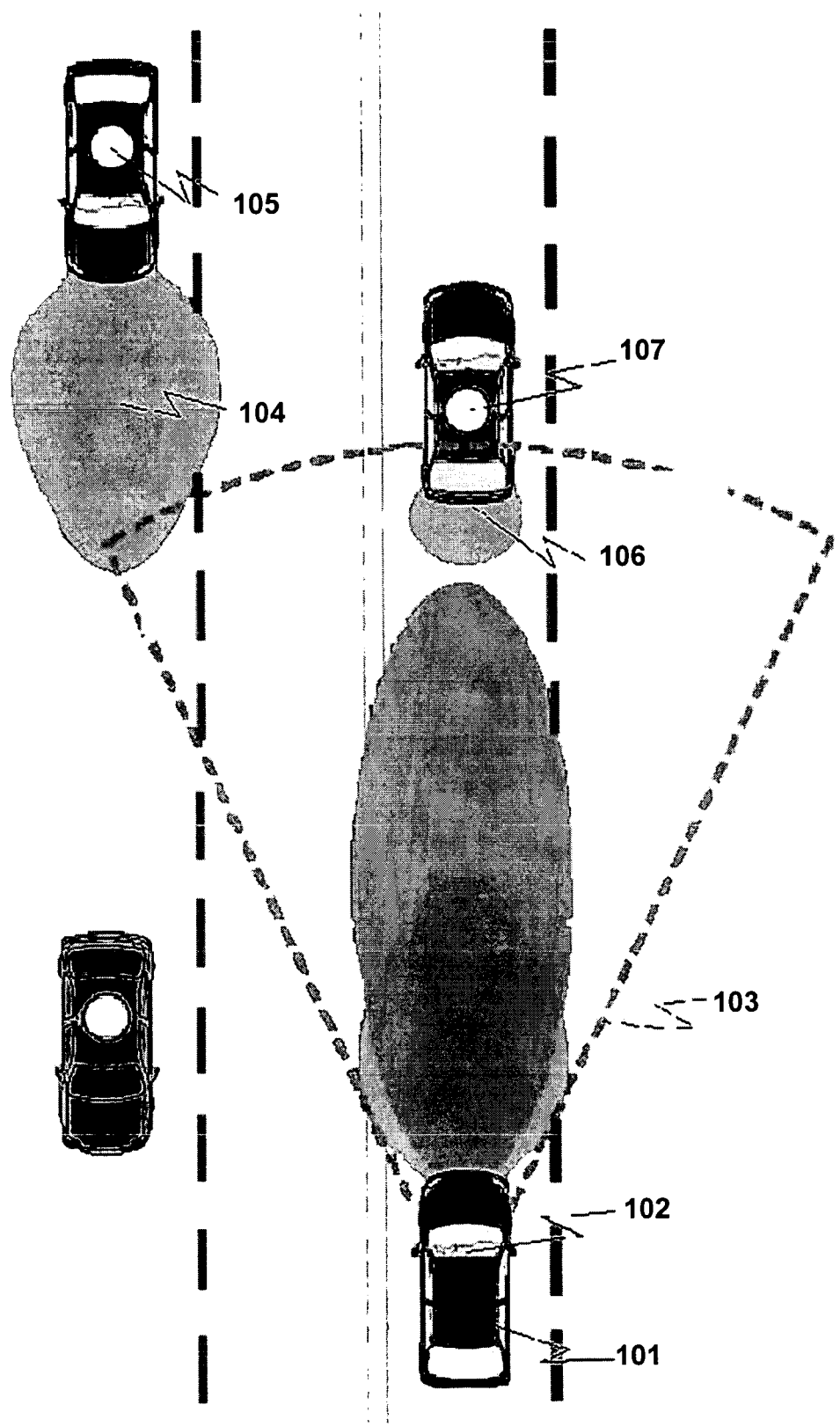
FIG. 1 depicts a controlled vehicle in relation to other oncoming and leading vehicles.

The functionality of the current invention is best described with initial reference to FIG. 1. A controlled vehicle 101 contains an imager and an image processing system that is capable of acquiring and analyzing images of the region generally forward of the controlled vehicle. The imager and image processing system are preferably contained in the controlled vehicle's rear view mirror assembly 102, thus providing a clear forward view 103 from a similar perspective as the driver through the windshield in the region cleaned by the windshield wipers. The imager may alternatively be placed in any suitable position in the vehicle and the processing system may be contained with the imager or positioned elsewhere. A host of alternate configurations are described herein, as well as, within various incorporated references. The image analysis methods described herein may be implemented by a single processor, such as a microcontroller or DSP, multiple distributed processors, or may be implemented in a hardware ASIC or FPGA.

The imager acquires images such that the head lamps 104 of oncoming vehicle 105 and the tail lamps 106 of preceding vehicle 107 may be detected whenever they are within an area where the drivers of vehicles 105 or 106 would perceive glare from the head lamps of controlled vehicle 101. When head lamps or tail lamps are detected, the high beams of controlled vehicle 101 may be switched off or the beam pattern may be otherwise modified in such a way as to reduce glare to the occupants of other vehicles.

Figure 2:
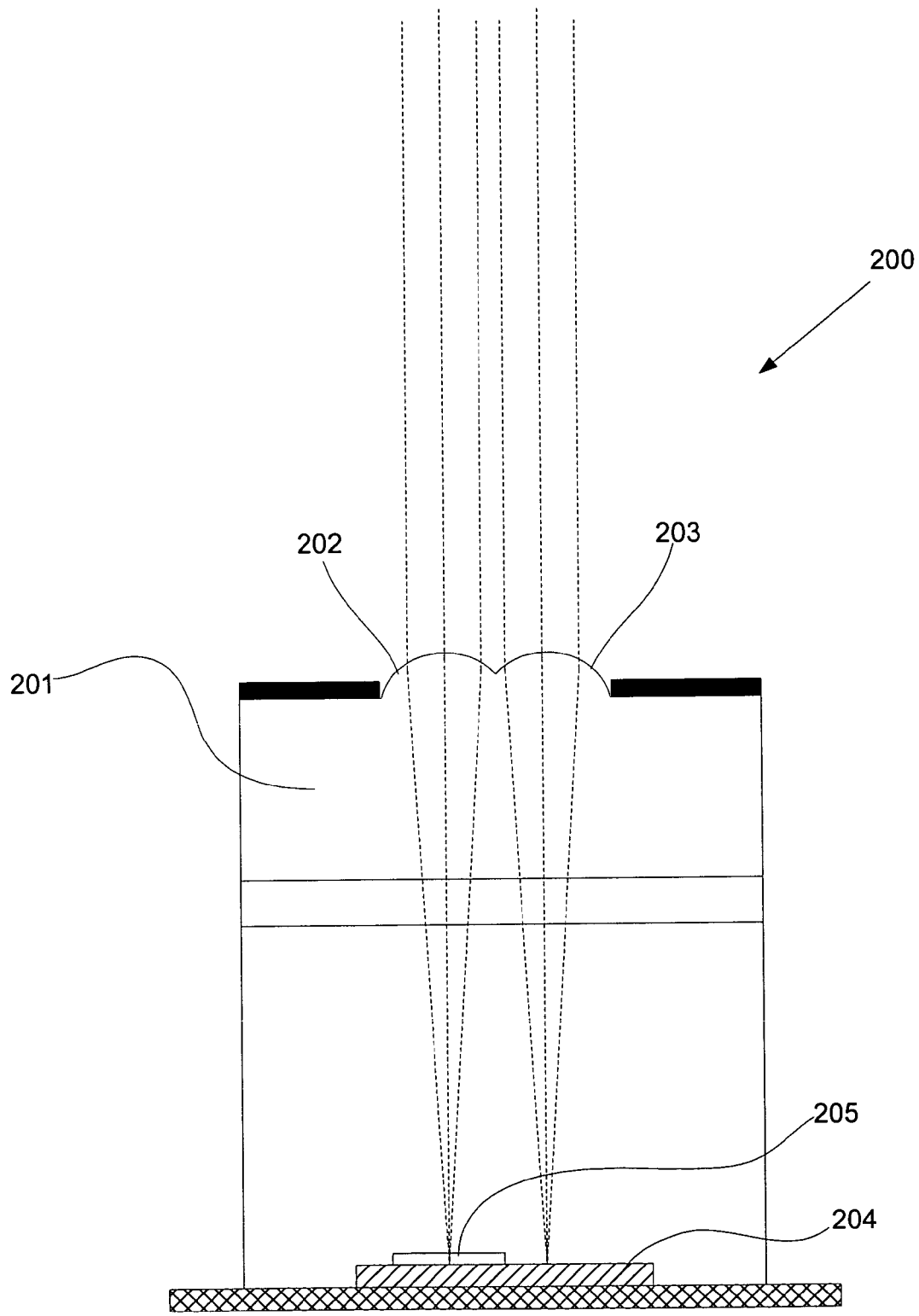
FIG. 2 depicts an embodiment of an imager.

An imager 200 for use with the present invention is shown in FIG. 2. A lens 201 containing two separate lens elements 202 and 203 forms two images of the associated scene onto an image sensor 204. One image of the scene is filtered by a red filter 205 placed on the surface of the image sensor 204 and covering one half of the pixels. By comparing pixels in the filtered and non-filtered images corresponding to the same regions of space, the relative redness of light sources detected by those pixels can be determined. Other methods of color discrimination, such as the use of checkerboard red/clear filters, striped red/clear filters, or mosaic or striped red/green/blue filters may also be used. Detailed descriptions of optical systems for use with the present invention are contained in copending U.S. Pat. No. 6,130,421 entitled Imaging system for vehicle headlamp control and U.S. patent application Ser. No. 10/208,142 entitled Light Source Detection and Categorization system for Automatic Vehicle Exterior Light Control and Method of Manufacturing, commonly assigned with the present invention and incorporated herein in their entireties by reference.

Figure 3:
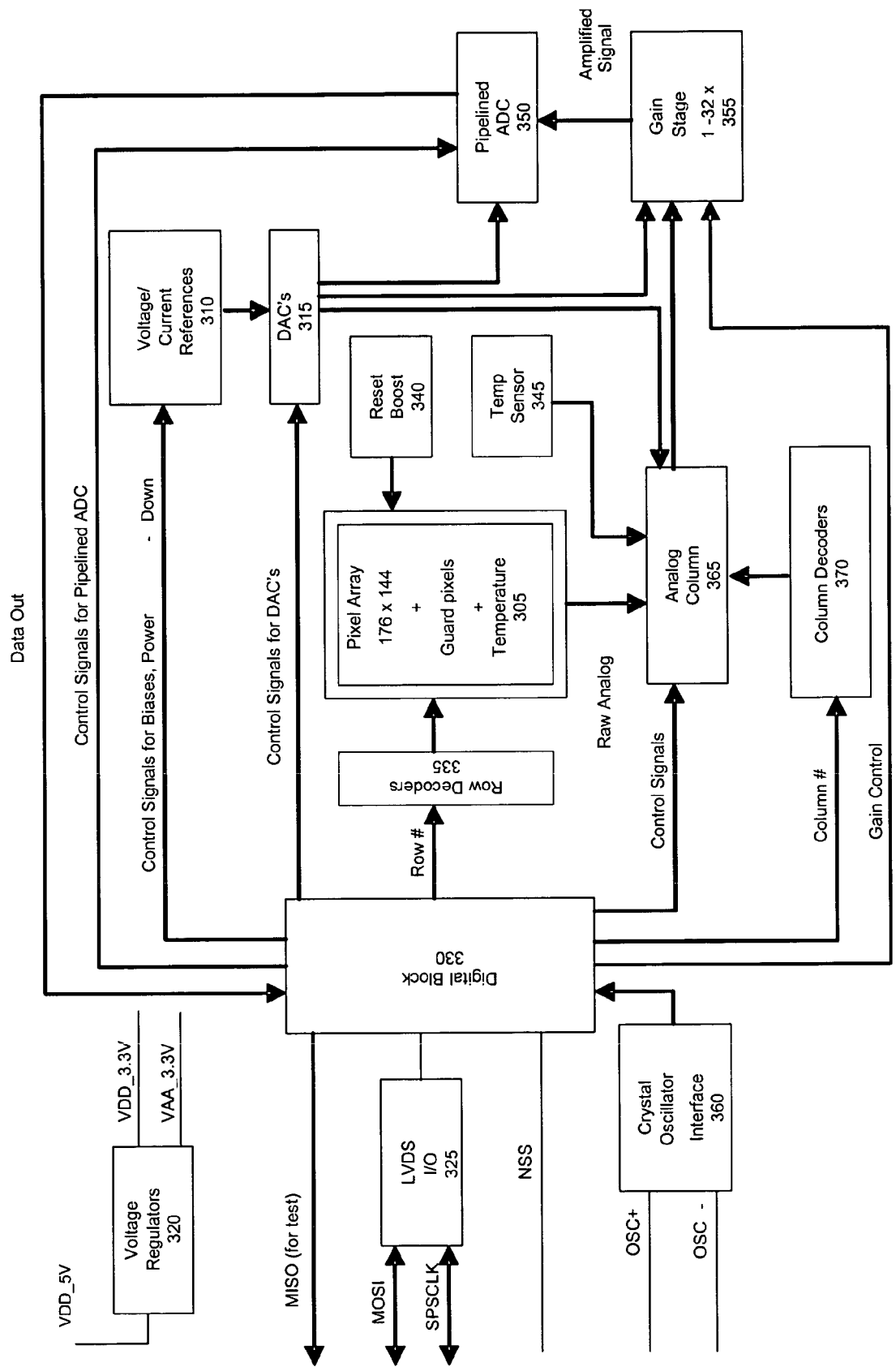
FIG. 3 depicts an embodiment of an image sensor with related components.

Turning now to FIG. 3, a block diagram of an image sensor for use with the present invention is depicted. As shown, the imager comprises a pixel array 305, a voltage/current reference 310, digital-to-analog converters (DACs) 315, voltage regulators 320, low-voltage differential signal I/O 325, a digital block 330, row decoders 335, reset boost 340, temperature sensor 345, pipeline analog-to-digital converter (ADC) 350, gain stage 355, crystal oscillator interface 360, analog column 365 and column decoders 370. Preferably, these devices are integrated on a common circuit board or silicon substrate. However, any or all of the individually identified devices may be mounted to a separate structure. Details of a preferred imager in accordance with that shown in FIG. 3 is described in detail in commonly assigned U.S. provision patent application No. 60/495,906, entitled IMAGE ACQUISITION AND PROCESSING SYSTEM, the disclosure of which is incorporated in its entirety herein by reference.

In a preferred embodiment, the imager is a CMOS design configured to meet the requirements of automotive applications. Preferably, the imager provides 144 columns and 176 rows of photodiode based pixels. Preferably, the imager also has provisions for sensing temperature, controlling at least one output signal, providing voltage regulation to internal components, and incorporated device testing facilities. Imager commands preferably provide control of a variety of exposure, mode and analog settings. The imager is preferably capable of taking two image subwindows simultaneously from different starting rows; this feature permits highly synchronized images in a dual lens system as described with reference to FIG. 2. In a preferred embodiment, a single command instruction is sent to the imager and the imager then responds with two sequential images having unique exposure times. Another preferred option allows the analog gains to be applied in a checkerboard image for applications where a filter is applied to the imager in a checkerboard pattern. Preferably, data can be transmitted in ten bit mode, a compressed eight bit mode where a ten bit value is represented in eight bits (as described in more detail elsewhere herein), or a truncated eight bit mode where only the most significant eight bits of each ten bit pixel value is transmitted.

Figure 4:
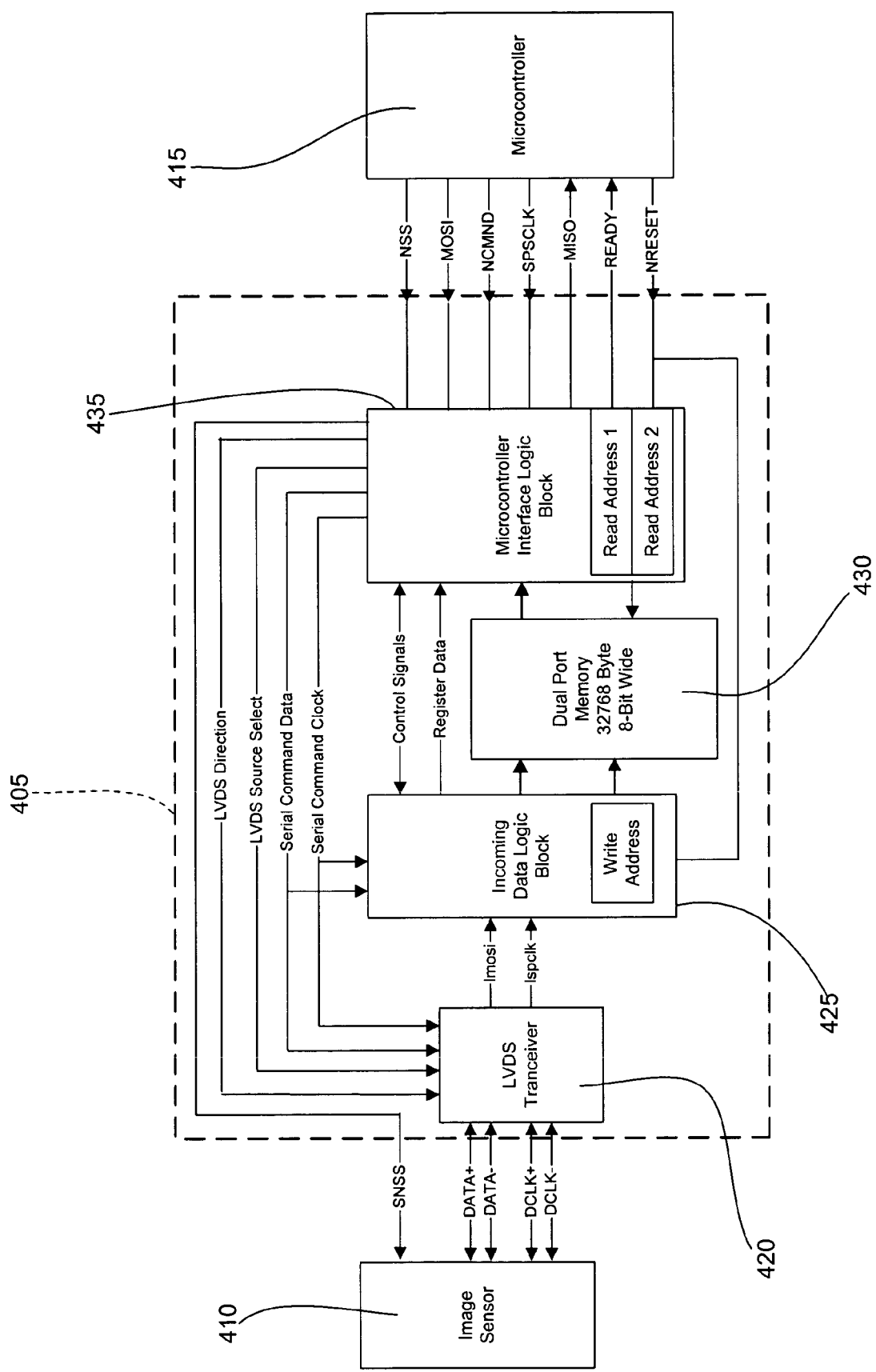
FIG. 4 depicts a low-voltage differential signal device with a memory buffer connected between an imager and a microprocessor.

Turning to FIG. 4, it is preferred that control and data signals are communicated between an image and an associated microprocessor via a low-voltage differential signaling serial peripheral interface (LVDS SPI) 405. As shown in FIG. 4, the LVDS SPI provides a communication interface between image sensor 410 and microcontroller 415. The preferred LVDS SPI comprises a LVDS transceiver 420, an incoming data logic block 425, a dual port memory 430, and a microcontroller interface logic block 435. It should be understood that a host of known LVDS devices are commercially available and it is envisioned that LVDSs other than that shown in FIG. 4 may be utilized with the present invention. For example, the dual port memory may be omitted and the control and data signals will be transmitted directly over the LVDS link. A more detailed description of the LVDS SPI interface in accordance with that shown in FIG. 4 is contained in commonly assigned U.S. provision patent application No. 60/495,906, the disclosure of which is incorporated in its entirety herein by reference.

In a preferred embodiment, the dual port memory is provided to enable the microcontroller to perform other functions while image data is being sent from the imager. The microcontroller then reads the image data from the dual port memory once free to do so. Preferably, the dual port memory allows sequential access to individual memory registers one-by-one. In a special alternate mode readout, two read pointers are provided to allow alternate access to two different regions of memory. This feature is particularly beneficial when used along with the dual integration time feature of the image sensors. The image sensor will send two images sequentially having different integration times. In the alternating readout mode, the first pointer is set to the start of the first image and the second pointer to the start of the second. Thus, for each pixel location the first integration time pixel value is read out first followed by the pixel value from the second integration.

An image acquisition and analysis method of the present invention is described with reference first to FIG. 5. The control proceeds as a sequence of acquisition and processing cycles 500, repeated indefinitely whenever control is active. Cyclic operation may occur at a regular rate, for example once every 200 ms. Alternatively, the cyclic rate may be adjusted depending on the level of activity or the current state of the vehicle lamps. Cycles may be interrupted for other functions. For example, the processing system may also control an automatic dimming rear view mirror, a compass, a rain sensor, lighting, user interface buttons, microphones, displays, vehicle interfaces, telemetry functions, multiplexed bus communication, as well as other features. If one of these features requires processor attention, cycle 500 may be suspended, interrupted or postponed.

Cycle 500 begins with the acquisition of one or more images 501 that are, at least in part, stored to memory for processing. The corresponding images may be synthetic high dynamic range images as described further herein. Next, in step 502, various objects and properties of these objects are extracted from the acquired images. These objects usually are light sources that must be detected and classified. The term "light source" as used herein includes sources that emit light rays, as well as, objects that reflect light rays. In step 503 the motion of light sources and other historical behavior is determined by finding and identifying light sources from prior cycles and associating them with light sources in the current cycle. Light sources are classified in step 504 to determine if they are vehicular head lamps, vehicle tail lamps, or other types of light sources. Finally, in step 505, the state of the controlled vehicle lamps are modified, if necessary, based upon the output of step 504 and other vehicle inputs.

Figure 5:
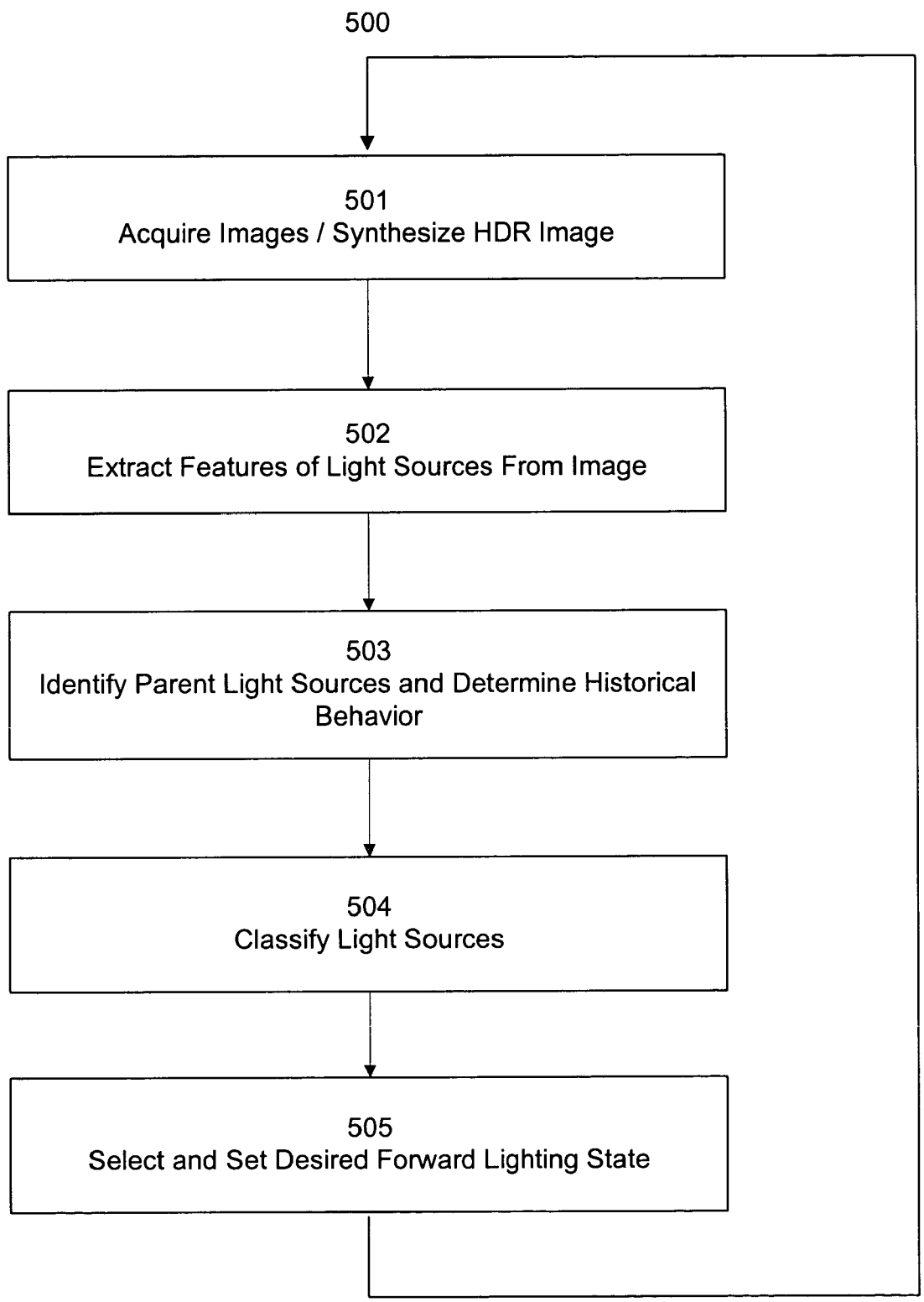
FIG. 5 depicts a flow chart for an algorithm to set the state of an exterior light based upon various light sources in an image.

It should be understood that although the steps in FIG. 5 are shown as sequential, it is possible to alter the order of the steps or perform various steps in parallel. For example, as discussed in more detail below, the preferred object extraction algorithm requires only four or even as few as two rows of the image be stored in memory at any given time, thus facilitating at least partial object extraction in parallel with image acquisition. Also, an image acquisition method presented herein may synthesize a high-dynamic range (HDR) image through multiple exposures and then processes the high-dynamic range image after synthesis. Alternatively, the images with each exposure setting may be processed independently from each other. Finally, each of the steps in FIG. 5 need not complete before the next step begins. For example, once a light source is detected in step 502, its historical information may be immediately determined in step 503 and it may be immediately classified in step 504. Then the next light source, if any, may be identified in step 502. It should also be understood that any of the steps of FIG. 5 may be beneficially applied to vehicle imaging systems independently of other steps, in various combinations with other steps or with prior art embodiments.

The wide range of light levels that must be detected by the imaging system presents a significant challenge. Bright head lamps are several thousand times more intense than distant tail lamps. Many of the techniques employed to distinguish lights from one another benefit from relatively accurate measures of brightness and color; therefore, saturation in the image due to brighter light sources may lead to misidentification. High dynamic range imagers have been developed that could be used beneficially; however, they remain fairly obscure and expensive. Details associated with creating a synthetic high dynamic range image are included in copending, commonly assigned, U.S. patent application Vehicle Vision System with High Dynamic Range, Ser. No. 10/615,317, the disclosure of which is incorporated herein in its entirety by reference. In at least one embodiment of the present invention, associated problems have been overcome through creation of a synthetic high dynamic range (HDR) image.

Figure 6:
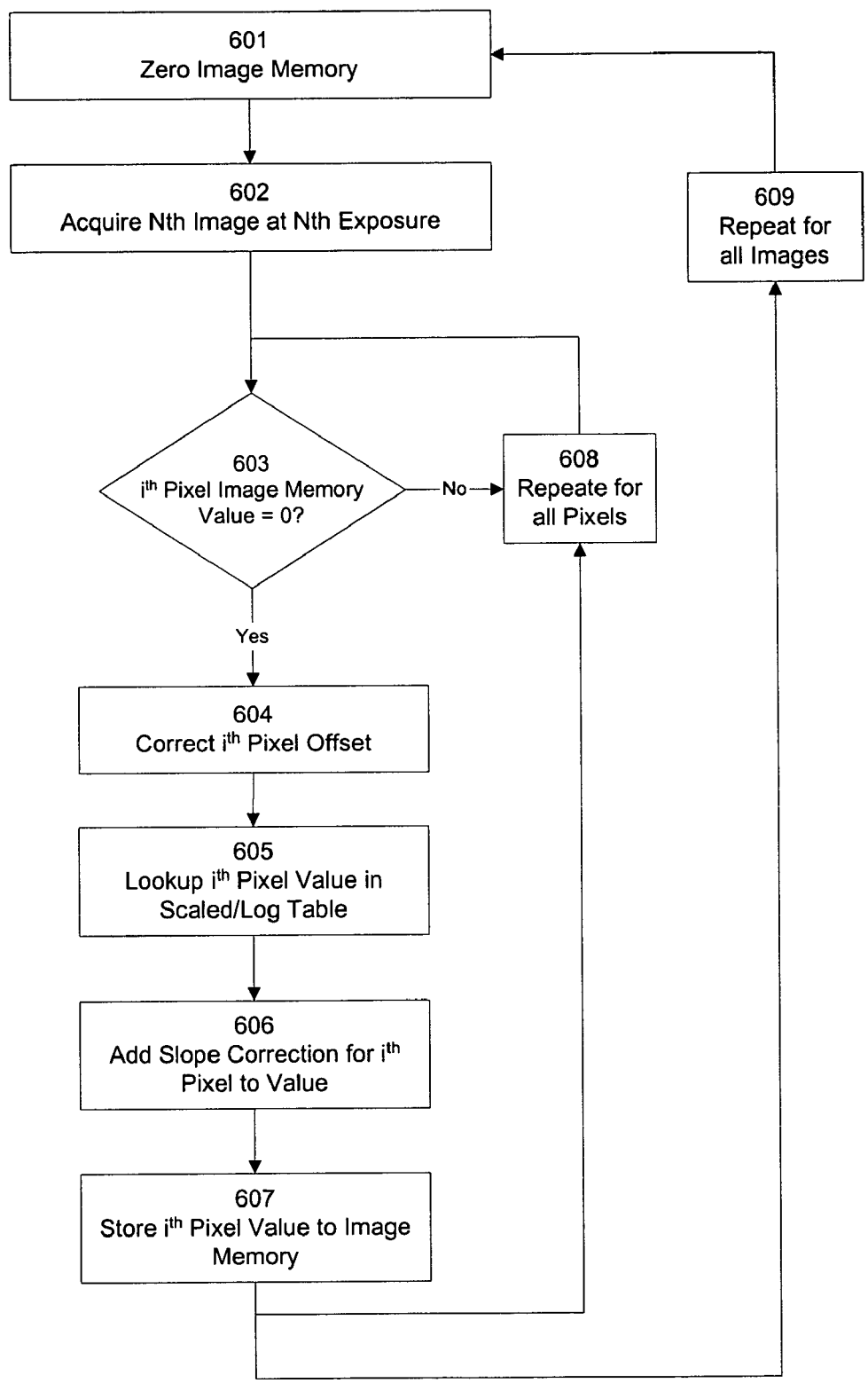
FIG. 6 depicts a flow chart for an algorithm to synthesize a high dynamic range image.

Referring to FIG. 6, the process for acquiring and synthesizing a HDR image includes the acquisition of two or more images at different exposures to cover different brightness ranges. While any number of images may be taken at different exposure intervals, three images will be used, as an example, with exposure times of 1, 6, and 36 ms. In a preferred embodiment, an HDR is synthesized utilizing five images, each with a unique integration period, For example, with exposures of 0.25, 0.5, 2, 8 and 30 ms. As described herein, a preferred imager provides the ability to acquire two images with unique integration periods with a single command; it may be desirable to create a HDR utilizing two images having unique integration periods, for example using integration times between 0.5 and 50 ms. It may desirable, irrespective of the number of images utilized, to employ integration times ranging from 0.5 to 50 ms. It may be desirable to utilize any number of individual images, for example, a range of 1 to 10 images may be utilized. First, in step 601, the image memory is zeroed. Next, in step 602, the first image with the shortest exposure (1 ms) is acquired. Step 603 is irrelevant for the first image since the memory is all zeros.

Step 604 represents an optional step used to correct for fixed pattern imager noise. Most image sensors exhibit some type of fixed pattern noise due to manufacturing variances from pixel to pixel. Fixed pattern noise may be exhibited as a variance in an offset, a gain or slope or combination thereof. Correction of fixed pattern noise may improve overall performance by assuring that the sensed light level of an imaged light source is the same regardless of the pixel onto which it is imaged. Improvements in imager fabrication process may render this correction unnecessary.

If correction is warranted, correction in offset (step 604), slope (step 606) or both may be accomplished by the following method. To provide the correction, each sensor is measured during manufacturing and a pixel-by-pixel lookup table is generated that stores the offset and/or slope error for each pixel. In step 604, the offset is corrected by adding or subtracting the error value stored in the table for the current ($i^{th}$) pixel. Slope correction may also be applied at this point by multiplying the pixel value by the slope error factor. However, since the image is preferably converted to logarithmic normalized values the slope correction may be applied by a less computationally expensive addition or subtraction to the logarithmic value in step 606. In a modification of this method, several different pixel response ranges are identified and a corresponding correction look-up-table is created, each of which is identified as a particular bin. During manufacturing each pixel of an imager is measured and the nearest correction look-up-table is identified. The pixel is then assigned a bin number that is stored in the processors nonvolatile memory. When images are taken during operation, the correction lookup table corresponding to the bin of the given pixel is applied and the imager uniformity is improved.

In step 605, the pixel value (plus the optional offset correction from step 604) is converted for creation of the HDR image. This conversion first may include an optional step of linearization. Many pixel architectures may respond non-linearly to incident light levels. This non-linearity may be manifested as an S-shaped curve that begins responding slowly to increasing light levels, then more linearly, and then tapers off until saturation. Such a response may induce error when attempting brightness or color computations. Fortunately, the non-linearity is usually repeatable and usually consistent for a given imager design. This correction is most efficiently achieved through a lookup table that maps the non-linear pixel response to a linear value. If the non-linearity is a consistent function for all imagers of the same design, the lookup table may be hard-coded into the processor. Otherwise it may be measured and stored on a chip-by-chip basis, as is the case for fixed pattern noise correction. Sensors that exhibit a substantially linear response will not require linearity correction.

The value of each pixel output must also be scaled by the ratio between the maximum exposure and the current exposure. In the case of this example, the data from the 1 ms image must be multiplied by 36. Finally, to accommodate the wide dynamic range, it is beneficial to take the logarithm of this value and store it to memory. This allows for the pixel value to be maintained as an 8-bit number thus reducing the memory requirement. If sufficient memory is available, logarithmic compression may be omitted. While the natural log is commonly used, log base 2 may alternatively be used. Highly computationally efficient algorithms may be used to compute the log and anti-log in base 2. The entire computation of step 605, linearization, scaling, and taking the logarithm is preferably performed in a single look-up table. A lookup table with these factors pre-computed is created for each exposure setting and used to convert the value from step 604 to the value to be stored to memory. Alternatively, as described herein with reference to FIGS. 7, 8, 9a and 9b, a 10-bit to 8-bit compression algorithm may be employed.

Finally, if fixed pattern noise correction is used, the slope error correction may be applied in step 606 to the logarithmic value from step 605. The final value is stored to memory in step 607. This entire process proceeds for each pixel in the image as indicated by step 608. Once the first image is stored, the next higher exposure image may be acquired. Processing for this and all subsequent images proceeds similarly except for step 603. For the second and later images, values are only stored to memory if no value from a lesser sensitivity image was detected. If a value is currently in memory there is no need for the value, that is likely saturated or nearer saturation, from a higher sensitivity image. Essentially, the higher sensitivity images simply serve to "fill in the blanks" left by those pixels that did not sense any light in prior images. Finally, when the highest exposure (36 ms in this example) image is acquired, no scaling will be necessary.

With reference to the above discussion, the skilled artisan may identify many variations to the above method that are within the spirit of the present invention. For example, the process may occur backwards, beginning with the highest sensitivity image. In this case, pixels that are saturated from the higher sensitivity images may be replaced by non-saturated pixels from lower sensitivity images. Multiple images may be taken at each sensitivity and averaged to reduce noise. Functions other than the log function may be used to compress the range of the image such as deriving a unity, normalized, factor. Bit depths other than 8-bits may be used to acquire and store the image such as 9-bits, 10-bits, 16-bits, 32-bits and 64-bits. Finally, methods other than varying the exposure time, such as varying gain or A/D conversion parameters, may be used to alter the sensitivity of the acquired images.

Finally, it is also possible to independently store individual images of different sensitivities rather than store a single synthetic high dynamic range image. This method is useful when sufficient memory is available to store more than one image, as may be the case when a memory buffer is provided as discussed with regards to the LVDS SPI interface of FIG. 4, discussed in greater detail herein below. In this case, pixel value is chosen from the appropriate exposure image and appropriately scaled during the object detection of step 502.

Dynamic range compression of image grayscale values may also occur in hardware, either as a feature provided on chip with the image sensor or through associated circuitry. This is especially beneficial when 10 bit or higher resolution A/D converters are provided, since many bus communication protocols, such as the SPI bus, typically transmit data in 8-bit words or multiples of 8 bits. Thus a 10-bit value would be usually be transmitted as a 16-bit word and actually take twice the bandwidth and memory of an 8-bit value. For camera based control functions such as the head lamp control function, the requirements for reading resolution are usually more closely aligned with constant percent of reading than with constant percent of full scale. The percentage change of a linearly encoded variable is a constant percent of full scale for each incremental step in the reading whereas the percentage change in the linear value corresponding to its logarithmically encoded counterpart is a constant percent of the linear reading for each incremental step in its associated log encoded value. With linear encoding the incremental change for a small value which is close to zero is a very large percent of the reading or value and the incremental change for a large value which is close to full scale is a very small percent of the reading or value. In a camera analog to digital converter, the conversion is normally linear and must be converted or mapped to another form when such a conversion is needed.

Unless it is stated otherwise, it will generally be assumed that incremental accuracy refers to values already in or converted back to their linear range. For linearly encoded values which are close to zero, the incremental step is a large percentage of the reading and mapping these into readings where the incremental change in the associated linear value is smaller will result in single input values being mapped into multiple output values. An object of encoding values from a larger to a smaller set is to preserve necessary information with a smaller number of available bits or data points to encode the values. For example, in converting a 10 bit value to a compressed 8 bit value, the available number of data points drops by a factor of four from 1024 in the input set to 256 in the converted output set. To make effective use of the smaller number of available points, a given number of input codes in the larger input space should not in general map into a larger number of codes in the output space. If this is done, for example in the 10 bit to 8 bit conversion, it will not leave as many points in the 8 bit output space where lossy compression is required to map the larger number 10 bit codes into the much smaller number of 8 bit codes. From this we can see that the conversion mapping needs to be planned so that for each range of the input values to be mapped, the desired information is preserved while being sparing in the use of output codes. For small values, the available information is normally needed and any encoding losses, including round off errors, may be objectionable so a prudent approach is to map small values directly to the output space without conversion other than the possible addition or subtraction of a constant value. Logarithmic encoding is desirable for larger values to maintain an approximately equal percentage change of the associated linear input value for each incremental step in the output range. The logarithm also has the desirable property that the effect of the application of a constant multiplier in the linear domain may be offset by the subtraction of the log of this multiplier in the log domain. Thus, as is normally done when using logarithms for calculation, a variant of scientific notation may be used applying a multiplier and expressing the number as a value in a specified range times an integral power of this range. For binary numbers, it is normally most convenient to choose a range of two to one, an octave, and to express the number as a normalized value which spans one octave times a power of two. Then for the log range, depending on the output codes available, the number of output values per octave may be chosen.

It should be understood that many monotonic linearization algorithms may be used in addition to a logarithmic linearization for data compression. Additionally, non-decreasing algorithms may be employed for data compression.

A convenient definition of resolution expressed as a percent or fraction of linear reading is need for the discussion. This may be defined for a given output value as the ratio of the difference of the linear equivalent of the next value in the output sequence of values minus the linear equivalent of the given output value to the linear equivalent of the given output value. Let the $i^{th}$ output value in the decoder output sequence be expressed as O(i) and let the linear equivalent of this value be expressed as LInv(O(i)). Let the defined linear reading based resolution be denoted by RIrb(O(i)). Then $$RIrb(O(i))=100*(LInv(O(i+1))-LInv(O(i)))/LInv(O(i)) \quad (1)$$

For a logarithmic encoding with n values per octave, RIrb is constant (neglecting conversion round off errors) for the logarithmically encoded values and is $$RIrb(O)=100*(\exp(\log(2)/n)-1) \quad (2)$$

where exp(x) is the natural number e raised to the power x and log(x) is the natural log of x.

For a linear one to one output encoding $$O(i)=i \quad (3)$$

and $$RIrb(i)=100/i \quad (4)$$

As an example, for encoding a ten bit input as an 8 bit compressed output, map the first 64 input values, 0-63, directly to 0-63 of the output and then logarithmically map each of the four octaves, 64-127, 128-255, 256-511, and 512-1023, respectively, to 48 count output ranges, 64-111, 112-159, 160-207, and 208-255. Then from equation (2), RIrb is approximately equal to 1.45% per increment for values in the logarithmic conversion range which maps input range 64-1023 to output range 64-255. For the top end, 63, of the linear range, from equations (3) and (4), RIrb(63) is approximately equal to 1.59% per increment which is close to 1.45% per increment for the logarithmic encoding making it a good place for the transition from linear one to one mapping to logarithmic mapping. In fact in the preferred implementation for which the input to output mapping is depicted by the curve in FIG. 7, the log conversion for the octave from 64 through 127 maintains the one to one mapping of input to output through value 77. By appropriately shifting the input data, the same one octave linear to log conversion may be used for each of the four octaves. With the encoding, a variable which is greater than another in the output range assures that the same relation held for the related pair of values in the input range.

Cameras which incorporate stepwise linear compression are known to the inventor as are cameras with sensing arrangements which have a nonlinear and perhaps logarithmic light sensing characteristic to achieve an extended range. Cameras which combine ranges so that part of the output range is linear and part is logarithmic are not known. No cameras for the headlamp dimmer application which incorporate any form of compression in the camera module are known to the inventor.

Figure 9A:
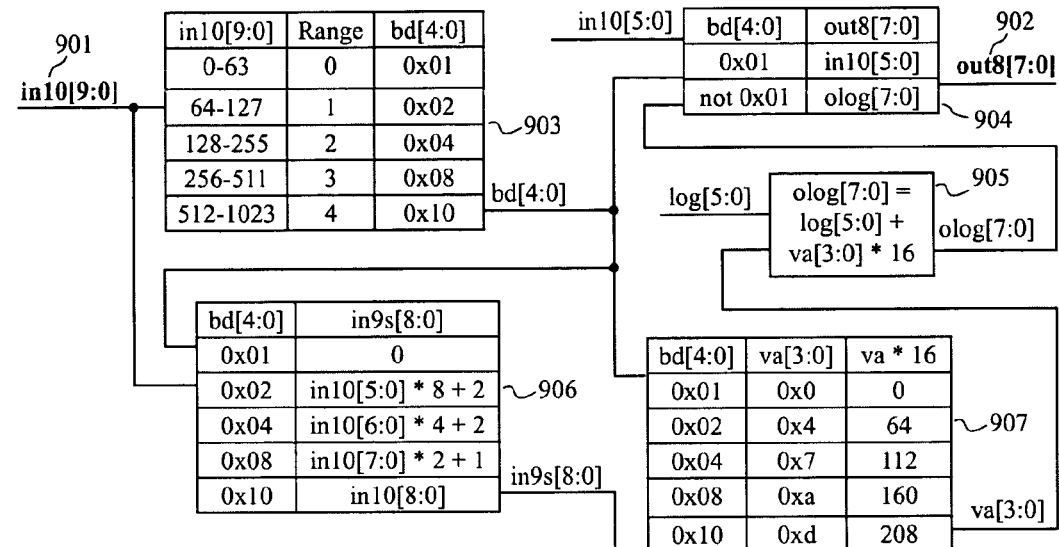

A preferred embodiment of the invention is detailed in block diagram form in FIGS. 9a and 9b. The implementation described is a combinatorial circuit but sequential or asynchronous implementations are within the scope of the invention. Ten bit digital input signal in10[9:0] (901) is input to the circuit and the combinatorial output is eight bit signal out8[7:0] (902).

In block 903, one high range indication signal bd[4:0] is generated with one of the 5 lines of bd[4:0] high and the others zero for each of the input ranges as indicated. The input value ranges for in10[9:0] are shown in the first column in decimal as numbers without underscore separators or a 0x prefix. The output numbers prefixed by 0x are in hexadecimal format. Binary numbers in block 308 are indicated by an underscore separating each group of four binary 0 and 1 digits. These conventions will be used for each of the blocks in FIGS. 9a and 9b. A range designation from 0 to 4 is shown in the middle column of block 903 and is for convenience since the range is referenced so often in the logic and in this description. Input values which are in range 0 (Input values from 0 through 63) are passed directly to output out8[7:0] without alteration. Each of the other four ranges span one octave. (In these discussions, the octave is taken to include the lowest number and the number two times this number is included with the next octave so that each of the octave related input values is, by this definition, included in exactly one octave.) As will be detailed in the description of associated blocks, when an input value is in any of the four one octave ranges 1 through 4, the value is scaled and, or, offset according to which range it is in and mapped into a 48 output value range using a common decoder block in the logic. The one octave 48 step logarithmically related output value is then scaled and, or, offset according to the range that the input value is in and directed to the output.

In block 906, the input value is scaled and, or, offset according to the range that it is in as indicated by the value of bd[4:0] and output as signal in9s[8:0] to the first block 908 of the logarithmic decoder. The logarithmic conversions are used for ranges 1 through 4 and due to the range classification criteria, the next higher bit which would be in10[6] to in10[9] for ranges 1 through 4, respectively, is always 1. Since this bit is always one and adds no variable information, it is omitted from the comparison and is also excluded as a leading tenth bit in the inverse log columns 3 and 6 of block 908. For an input value in range 4, all nine of the variable bits are included in the comparison for the logarithmic conversion. For an input in range 3, the value is shifted left 1 as indicated by the multiply by 2 and a 1 is placed on the lsb, bit in9s[0]. The 1 in bit zero by subjective comparison yielded the smoothest conversion result. For an input in range 2, the value is shifted left 2 places and binary 10 is placed in the two least significant bits to provide a smooth conversion result. For an input in range 1, the value is shifted left 3 places and binary 010 is placed in the three least significant bits to provide a smooth conversion.

Blocks 908, 909, and 910 are used to perform the 10 bit binary o 48 step per octave logarithmic conversion with 0 to 47 as the output log [5:0]. Block 908 is a group of 48 compare functions used in the ensuing blocks in the conversion. The ge[x, in9s[8:0]] terms are true if and only if the 9 bit input ge[x, in9s[8:0]] is a value whose output log [5:0] is greater than or equal to x. These functions are useful because to test that an output log [5:0] for an input in9s[8:0]] is in a range which is greater than or equal to a but less than b the following expression may be used:

ge[a, in 9s/8:0]] and not ge[b, in 9s/8:0]]

Many such ranges must be decoded to provide logic expressions for each of the 6 bits in the 48 value output range.

For convenience, in some of the Figs. and description, ge[x] will be used to mean the same thing as ge[x, in9s[8:0]].

Term ge[0, in 9s/8:0]] is always true so does not appear explicitly in the ensuing terms. The value x in columns 1 and 4 is the index for the $x^{th}$ value of the octave and the zeroth value, x=0, is the start of the octave and the $47^{th}$ value, x=47, is the last value before the start of the next octave. ge[x, in9s[8:0]] is the function which represents the combinatorial logic function whose value is 1 if and only if in9s/8:0] is greater than or equal to the associated Inverse log(x) value shown in the third or sixth column of block 908. As indicated before, the msb which is 1 is not shown. The inverse log values may be generated by the equation $$\exp(((x/48)+9)*\log(2))$$

where exp(y) is the exponential function with the natural number e raised to the $y^{th}$ power and log(z) is the natural log of z. The value of the above ranges from 512 through the value which is one step before 1024 for which x would equal 48. Values for this function yield the desired octave (between successive octaves the value for x equal 48 is included as the value for x=0 in the next octave.). The most significant 1 bit is omitted in columns 3 and 6 of block 908.

Because of the 47 ge[x, in9s/8:0]] terms which are used and for which logic circuits must be provided, it is advantageous to create common intermediate terms which may be shared for the many greater equal logic terms which are needed. Decoding circuits to indicate that specified ranges of consecutive bits in in9s/8:0] are all one are useful as are decoding circuits to indicate that specified ranges of consecutive bits are greater than or equal to one (not all zero). Such terms have been used extensively in the code to enable sharing of logic terms for the 47 decoder expressions which are implemented.

In block 909, an optional gray code encoding stage is used and optionally, the encoding could be done directly in binary but would require a few more logic terms. The encoding for each of the six bits g log [0] through g log [5] of an intermediate gray code is performed with each of the g log bits being expressed as a function of ge[x] terms. The gray code was chosen because only one of the six bits in g log [5:0] changes for each successive step in the g log output value. This generates a minimal number of groups of consecutive ones to decode for consecutive output codes for each of the output bits g log [0] through g log [5]. Thus, a minimal number of ge[x] terms are required in the logic expressions in column 2 of block 909.

In block 910, the gray code g log [5:0] input is converted to a binary log [5:0] output.

In block 907, the number to add to log [5:0] to generate the appropriate log based output value for inputs in ranges 1 through 4 is generated. The hexadecimal range of the in10[9:0] value is listed in the first column and the number to add to bits 4 through 7 of o log [7:0] is indicated in hexadecimal format in the second column. The third column indicates the actual offset added for each of the ranges when the bit positions to which the value is added are accounted for.

In block 905, the offset value va[3:0] is added, bits 0 and 1, to bits 4 through 5, respectively, of log [5:0] and appropriate carries are generated into bits 5, 6, and 7 to generate 8 bit log based output o log [7:0].

In block 904, the direct linear encoding in10[5:0] zero padded in bits 6 and 7 is selected for inputs in range 0 and the logarithmically encoded value o log [7:0] is selected for the other ranges 1 through 4 to generate 8 bit output out8[7:0].

Figure 7:
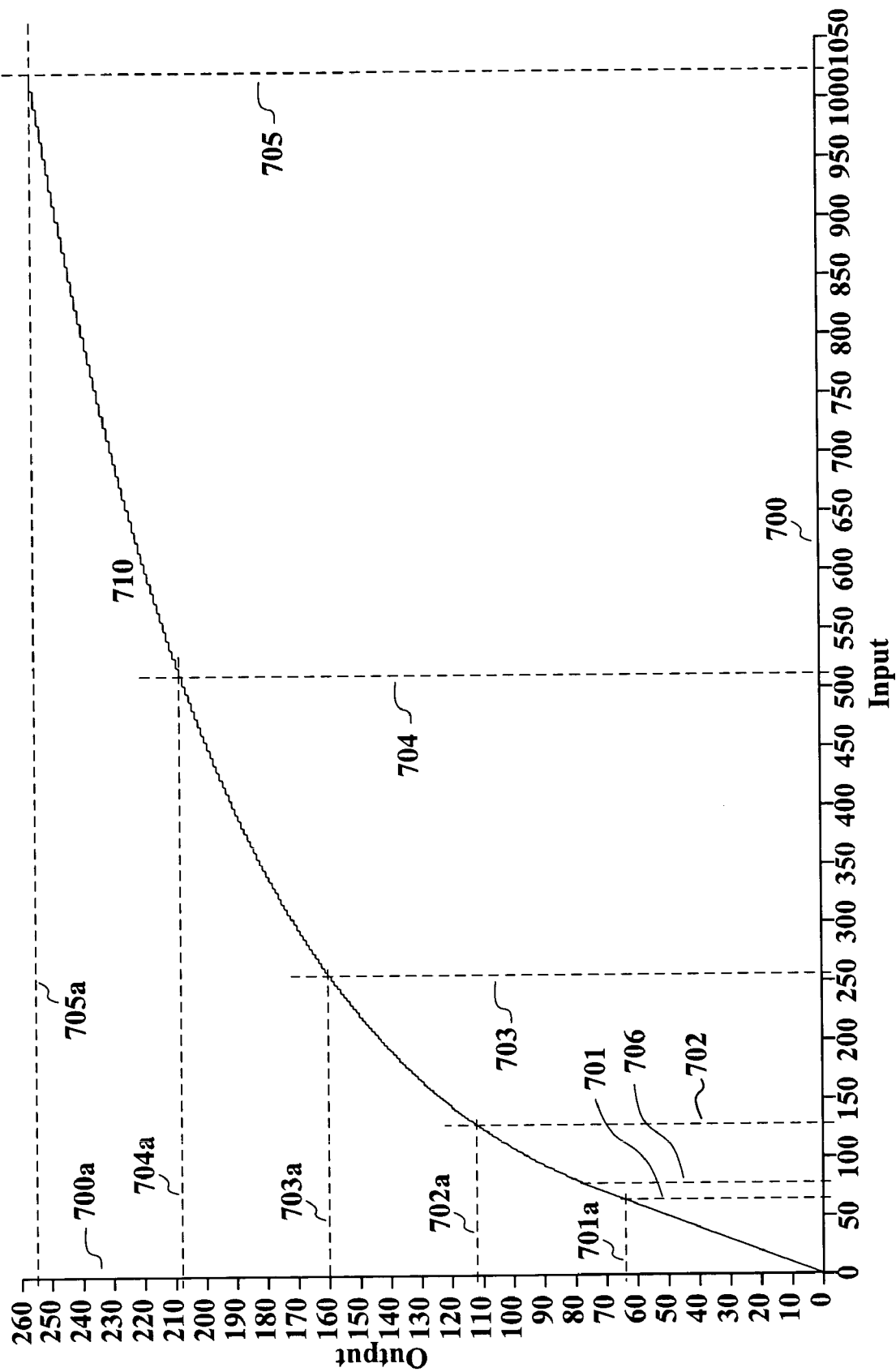
FIG. 7 depicts a graph of the results of a data compression algorithm.
Figure 8:
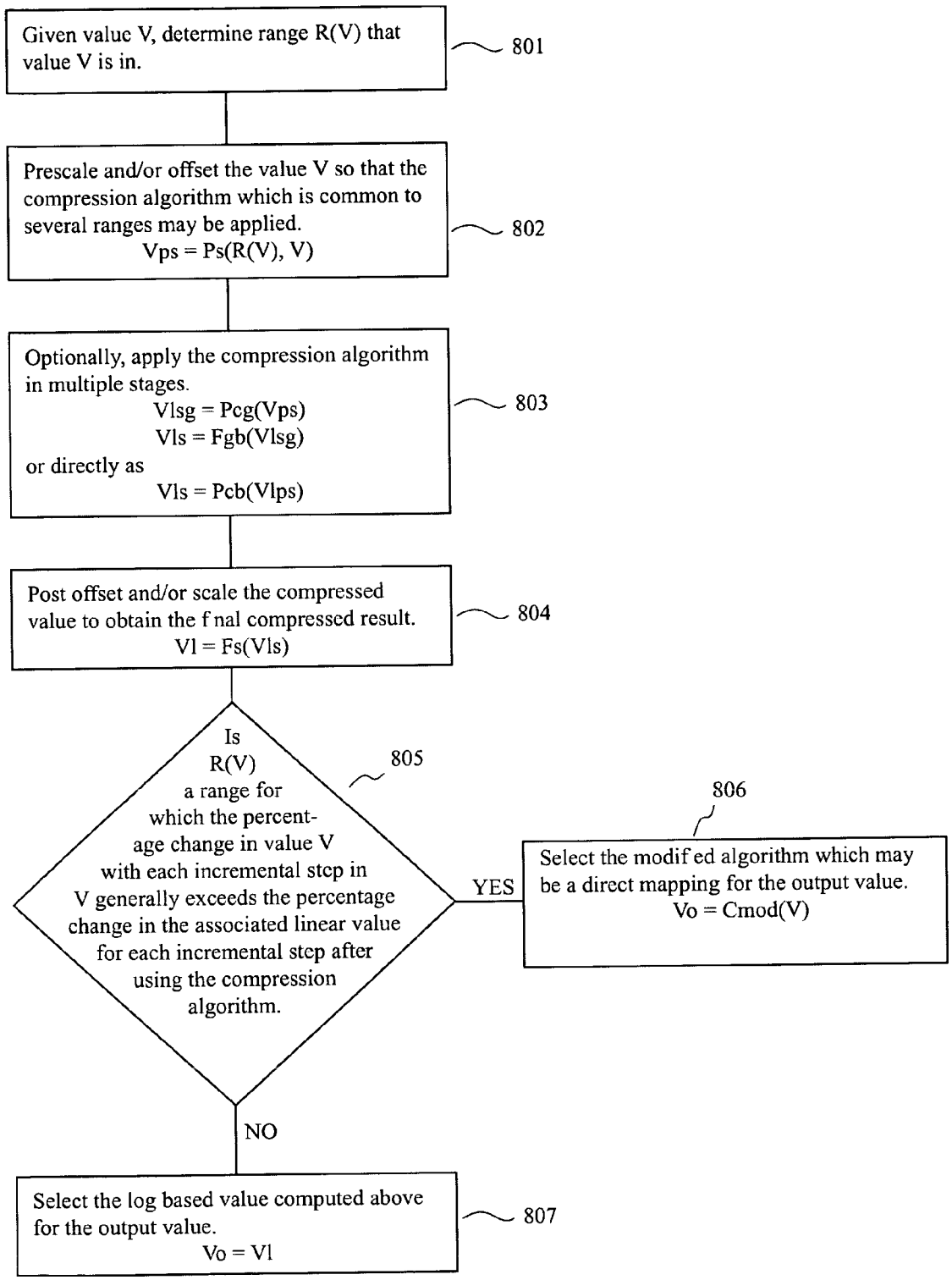
FIG. 8 depicts a flow chart for a data compression algorithm.

FIG. 7 depicts the output 700a as a function of the input 700 of a data compression circuit such as the one detailed in the block diagram of FIG. 8. The input ranges extend in a first range from 0 to (not including) 701 and similarly in four one octave ranges from 701 to 702, from 702 to 703, from 703 to 704, and finally from 704 to 705. The first range maps directly into range 0 to (not including 701a) and the four one octave ranges map respectively into 48 output value ranges from 701a to 702a, from 702a to 703a, from 703a to 704a, and finally from 704a to 705a. In a preferred implementation, the output for each of the four one octave output ranges is processed by a common input to log converter by first determining which range and thus which octave, if any, the input is in and then scaling the input to fit into the top octave from 704 to 705, then converting the input value to a 48 count 0-47 log based output. The offset at 701a, 702a, 703a, or 704a is then selectively added if the input is in the first, second, third or fourth octave, respectively. Finally, if the value is in range 0, the direct linear output is selected and otherwise, the log based value calculated as just described is selected to create the output mapping depicted by curve 710.

FIG. 8 is a procedural form of the conversion detailed in the block diagram of FIGS. 9a and 9b. In block 801 the range that the input is in is determined. In block 802 the value is prescaled and, or, translated to condition the value from the range that the input is in to use the common conversion algorithm. In block 803 the conversion algorithm is applied in one or in two or possibly more than two stages. In block 804, the compressed value is scaled and, or, translated so that the output value is appropriate for the range that the input is in. In block 806, the compression algorithm of blocks 801 through 804 is used if the range that the input is in is appropriate to the data and the value is output in block 807. Otherwise, an alternate conversion appropriate to the special range is output in block 806. Extraction of the light sources (also referred to as objects) from the image generated in step 501 is preformed in step 502. The goal of the extraction operation is to identify the presence and location of light sources within the image and determine various properties of the light sources that can be used to characterize the objects as head lamps of oncoming vehicles, tail lamps of leading vehicles or other light sources. Prior-art methods for object extraction utilized a "seed-fill" algorithm that identified groups of connected lit pixels. While this method is largely successful for identifying many light sources, it occasionally fails to distinguish between multiple light sources in close proximity in the image that blur together into a single object. The present invention overcomes this limitation by providing a peak-detect algorithm that identifies the location of peak brightness of the light source. Thereby, two light sources that may substantially blur together but still have distinct peaks may be distinguished from one another.

Figure 10:
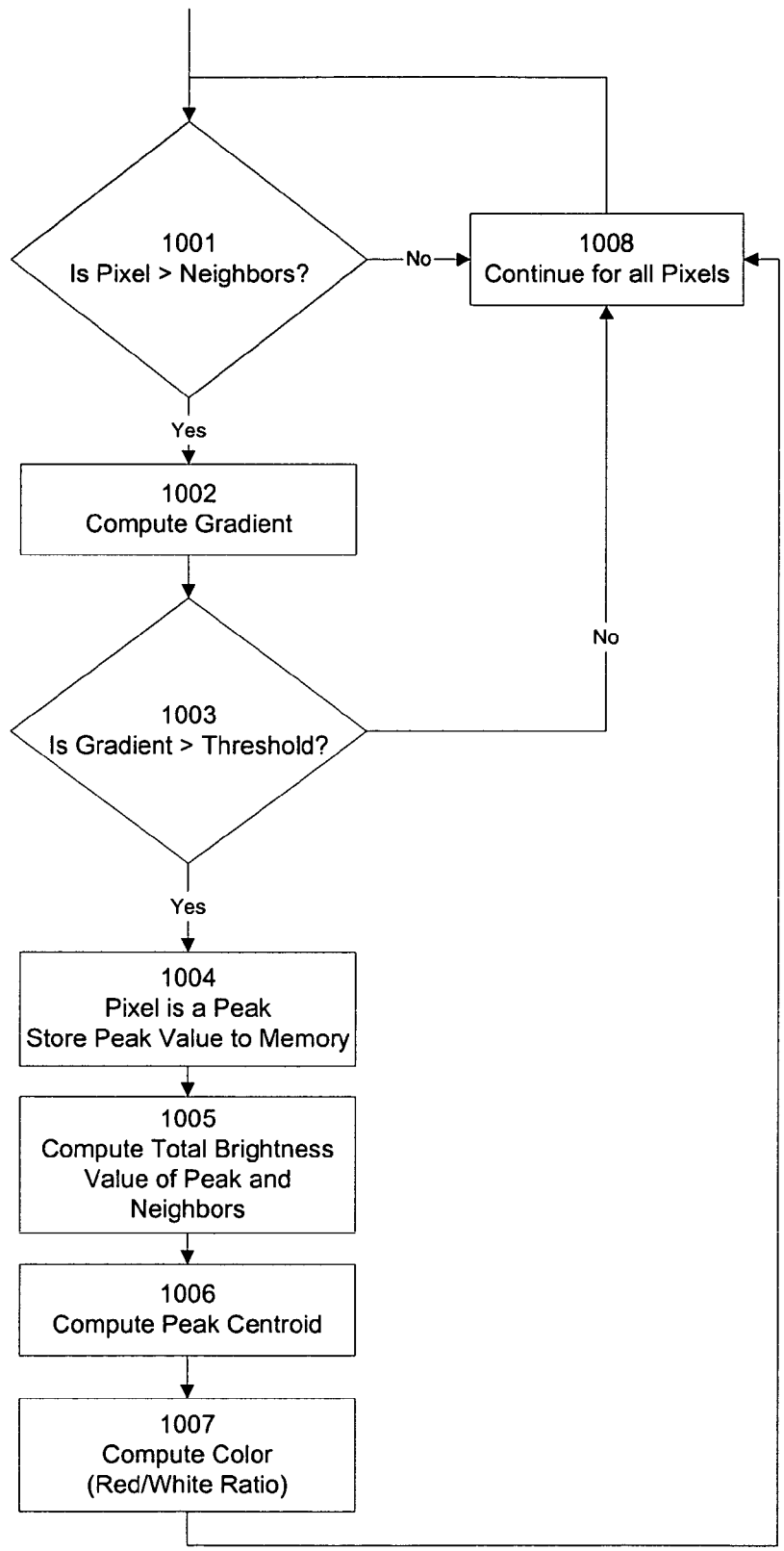
FIG. 10 depicts a flow chart for a peak detect algorithm.

A detailed description of this peak detection algorithm follows with reference to FIG. 10. The steps shown proceed in a loop fashion scanning through the image. Each step is usually performed for each lit pixel. The first test 1001 simply determines if the currently examined pixel is greater than each of its neighbors. If not, the pixel is not a peak and processing proceeds to examine the next pixel 1008. Either orthogonal neighbors alone or diagonal and orthogonal neighbors are tested. Also, it is useful to use a greater-than-or-equal operation in one direction and a greater-than operation in the other. This way, if two neighboring pixels of equal value form the peak, only one of them will be identified as the peak pixel.

If a pixel is greater than its neighbors, the sharpness of the peak is determined in step 1002. Only peaks with a gradient greater than a threshold are selected to prevent identification reflections off of large objects such as the road and snow banks. The inventors have observed that light sources of interest tend to have very distinct peaks, provided the image is not saturated at the peak (saturated objects are handled in a different fashion discussed in more detail below). Many numerical methods exist for computing the gradient of a discrete sample set such as an image and are considered to be within the scope of the present invention. A very simple method benefits from the logarithmic image representation generated in step 501. In this method, the slope between the current pixel and the four neighbors in orthogonal directions two pixels away is computed by subtracting the log value of the current pixel under consideration from the log value of the neighbors. These four slopes are then averaged and this average used as the gradient value. Slopes from more neighbors, or neighbors at different distances away may also be used. With higher resolution images, use of neighbors at a greater distance may be advantageous. Once the gradient is computed, it is compared to a threshold in step 1003. Only pixels with a gradient larger than the threshold are considered peaks. Alternatively, the centroid of a light source and, or, the brightness may be computed using a paraboloid curve fitting technique.

Once a peak has been identified, the peak value is stored to a light list (step 1004). While the peak value alone may be used as an indicator of the light source brightness, it is preferred to use the sum of the pixel values in the local neighborhood of the peak pixel. This is beneficial because the actual peak of the light source may be imaged between two or more pixels, spreading the energy over these pixels, potentially resulting in significant error if only the peak is used. Therefore, the sum of the peak pixel plus the orthogonal and diagonal nearest neighbors is preferably computed. If logarithmic image representation is used, the pixel values must first be converted to a linear value before summing, preferably by using a lookup table to convert the logarithmic value to a linear value with a higher bit depth. Preferably this sum is then stored to a light list in step 1005 and used as the brightness of the light source.

Computation and storage of the centroid of the light source occurs in step 1006. The simplest method simply uses the coordinates of the peak as the centroid. A more accurate fractional centroid location may be computed by the following formula:

$$X = \frac{\sum_{i=x-1}^{x+1} \sum_{j=y-1}^{y+1} val(i,j) \cdot i}{\sum_{i=x-1}^{x+1} \sum_{j=y-1}^{y+1} val(i,j)}$$

$$Y = \frac{\sum_{i=x-1}^{x+1} \sum_{j=y-1}^{y+1} val(i,j) \cdot j}{\sum_{i=x-1}^{x+1} \sum_{j=y-1}^{y+1} val(i,j)}$$

Where x is the x-coordinate of the peak pixel, y is the y-coordinate of the peak pixel and X and Y is the resulting centroid. Of course, neighborhoods other than the 3×3 local neighborhood surrounding the peak pixel may be used with the appropriate modification to the formula.

Finally, the color of the light source is determined in step 1007. For the above discussion, it is assumed that an imaging system similar to that of FIGS. 2 and 3 is used and the red filtered image is used to locate the centroid and perform all prior steps in FIG. 10. The red-to-white color ratio may be computed by computing the corresponding 3×3 neighborhood sum in the clear image and then dividing the red image brightness value by this number. Alternatively, only the pixel peak value in the red image may be divided by the corresponding peak pixel value in the clear image. In another alternative, each pixel in the 3×3 neighborhood may have an associated scale factor by which it is multiplied prior to summing. For example, the center pixel may have a higher scale factor than the neighboring pixels and the orthogonal neighbors may have a higher scale factor than the diagonal neighbors. The same scale factors may be applied to the corresponding 3×3 neighborhood in the clear image.

Misalignment in the placement of lens 201 over image array 204 may be measured during production test of devices and stored as a calibration factor for each system. This misalignment may be factored when computing the color ratio. This misalignment may be corrected by having different weighting factors for each pixel in the 3×3 neighborhood of the clear image as compared to that of the red image. For example, if there is a small amount of misalignment such that the peak in the clear image is ½ pixel left of the peak in the red image, the left neighboring pixel in the clear image may have an increased scale factor and the right neighboring pixel may have a reduced scale factor. As before, neighborhoods of sizes other than 3×3 may also be used.

For optical systems employing alternative color filter methods, such as a system using a mosaic filter pattern or striped filter pattern, color may be computed using conventional color interpolation techniques known in the art and "redness" or full color information may be utilized. Color processing may be performed on the entire image immediately following acquisition or may be performed only for those groups of pixels determined to be light sources. For example, consider an imaging system having a red/clear checkerboard filter pattern. The process depicted in FIG. 10 may be performed by considering only the red filtered pixels and skipping all the clear pixels. When a peak is detected, the color in step 1006 is determined by dividing the peak pixel value (that is a red filtered pixel) by the average of its four neighboring clear pixels. More pixels may also be considered for example four-fifths of the average of the peak pixel plus its four diagonal neighbors (also red filtered) may be divided by the four clear orthogonal neighbors.

Several other useful features may be extracted in step 502 and used to further aid the classification of the light source in step 504. The height of the light source may be computed by examining pixels in increasing positive and negative vertical directions from the peak until the pixel value falls below a threshold that may be a multiple of the peak, ½ of the peak value for example. The width of an object may be determined similarly. A "seed-fill" algorithm may also be implemented to determine the total extents and number of pixels in the object.

The above described algorithm has many advantages including being fairly computationally efficient. In the case where only immediate neighbors and two row or column distant neighbors are examined, only four rows plus one pixel of the image are required. Therefore, analysis may be performed as the image is being acquired or, if sufficient dynamic range is present from a single image, only enough image memory for this limited amount of data is needed. Other algorithms for locating peaks of light sources in the image may also be utilized. For example, the seed fill algorithm used in the prior art may be modified to only include pixels that are within a certain brightness range of the peak, thus allowing discrimination of nearby light sources with at least a reasonable valley between them. A neural-network peak detection method is also discussed in more detail herein.

One potential limitation of the peak detection scheme discussed above occurs when bright light sources saturate the image, even when a HDR image is used or other very bright objects appear. In this case, the objects may be so bright or large that no isolated peak is detected and therefore the object would be ignored. This limitation may be overcome in a few ways. First, any single pixel that is either saturated or exceeds a maximum brightness threshold may be identified as a light source, regardless whether it is a peak or not. In fact, for very bright lights, the entire process of FIG. 5 may be aborted and high beam headlights may be switched off. In another alternative, the sum of a given number of pixels neighboring the currently examined pixel is computed. If this sum exceeds a high-brightness threshold, it is immediately identified as a light source or control is aborted and the high beam headlights are dimmed. Normally, two conditions are used to qualify pixels as peaks, the pixel must be greater than (or greater than or equal to) its neighbors and, or, the gradient must be above a threshold. For saturated pixels, the gradient condition may be skipped since gradient may not be accurately computed when saturated.

Significant clues useful for the discrimination of vehicular light sources from other light sources may be gained by monitoring the behavior of light sources over several cycles. In step 503, light sources from prior cycles are compared to light sources from a current cycle to determine the motion of light sources, change in brightness of light sources, and, or, to determine the total number of cycles for which a light source has been detected. While such analysis is possible by storing several images over time and then comparing the light sources within these images, current memory limitations of low-cost processors make it more appealing to create and store light lists. Although, the concept of storing the entire image, or portions thereof, are within the scope of the present invention and should be considered as alternate approaches. It is more economical to store the lists of light sources found in one or more prior cycles and some, or all, of the properties of the individual light sources. These prior cycle lists may be examined to determine if a light source is detected in the current cycle that has a "parent" in the prior cycle.

Figure 11:
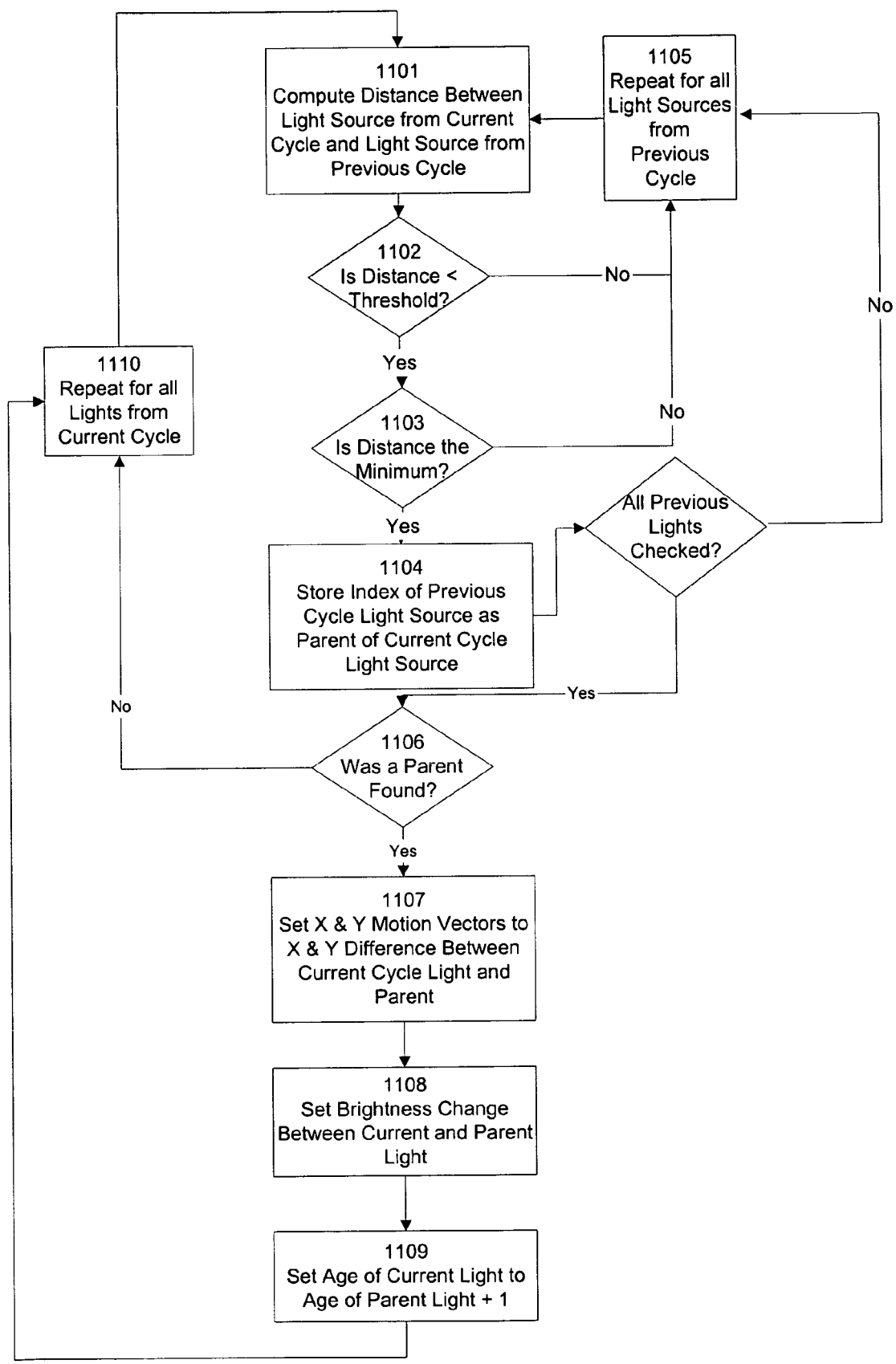
FIG. 11 depicts a flow chart for an algorithm to determine inter-frame light source characteristics.

Prior cycle light source parent identification is performed in accordance with FIG. 11. The process in FIG. 11 occurs for all light sources from the current cycle. Each light from the current cycle is compared to all lights from the prior cycle to find the most likely, if any, parent. First, in step 1101, the distance between the light source in the current cycle and the light source from the prior cycle (hereafter called current light and prior light) is computed by subtracting their peak coordinates and then compared to a threshold in step 1102. If the prior light is further away than the threshold, control proceeds to step 1105 and the next prior light is examined. The threshold in step 1102 may be determined in a variety of ways including being a constant threshold, a speed and/or position dependent threshold, and may take into account vehicle turning information if available. In step 1103 the distance between the prior light and current light is checked to see if it is the minimum distance to all prior lights checked so far. If so, this prior light is the current best candidate for identification as the parent. Another factor in the determination of a parent light source is to compare a color ratio characteristic of light sources of two images and, or, comparison to a color ratio threshold. It is also within the scope of the present invention to utilize a brightness value of determination of a parent light source. As indicated in step 1105, this process continues until all lights from the prior cycle are checked.

Once all prior lights are checked, step 1106 determines if a parent light was found from the prior cycle light list. If a parent is identified, various useful parameters may be computed. In step 1107, the motion vector is computed as the X and Y peak coordinate differences between the current light and the parent. The brightness change in the light source is computed in step 1108 as the difference between the current light and the parent light. The age of the current light, defined to be the number of consecutive cycles for which the light has been present, is set as the age of the parent light plus one. In addition to these parameters averages of the motion vector and the brightness change may prove more useful than the instantaneous change between two cycles, due to noise and jittering in the image. Averages can be computed by storing information from more than one prior cycle and determining grandparent and great-grandparent, etc. light sources. Alternatively a running average may be computed alleviating the need for storage of multiple generations. The running average may, for example, take a fraction (e.g. $\frac{1}{3}$) of the current motion vector or brightness change plus another fraction (e.g. $\frac{2}{3}$) of the previous average and form a new running average. Finally, light lists containing the position information and possibility other properties such as the brightness and color of detected light sources may be stored for multiple cycles. This information may then be used for the classification of the objects from the current cycle in step 504.

More advanced methods of determining light history information will be appreciated by one skilled in the art. For example, determination of the most likely prior light source as the parent may also consider properties such as the brightness difference between the current light source and the prior light source, the prior light source's motion vector, and the color difference between the light sources. Also, two light sources from the current cycle may have the same parent. This is common when a pair of head lamps is originally imaged as one light source but upon coming closer to the controlled vehicle splits into two distinct objects.

The trend in motion of an object may be used to select which of multiple objects from a prior image is the parent of the current object under consideration. Techniques for the tracking motion of objects are known in the fields of image and video processing and in other fields, such as for example the tracking of radar targets. These methods may be employed where appropriate and practical. Classification step 504 utilizes the properties of light sources extracted in step 502 and the historical behavior of light sources determined in step 503 to distinguish head lamps and tail lamps from other light sources. For summary, the following properties have been identified thus far: peak brightness, total brightness, centroid location, gradient, width, height and color. The following historical information may also be used: motion vector (x & y), brightness change, motion jitter, age, average motion vector and average brightness change. Additional properties may be identified that can improve discrimination when utilized with the classification methods presented below. In addition to the parameters extracted from image processing, various vehicle state parameters may be utilized to improve classification. These may include: vehicle speed, light source brightness that corresponds to the controlled vehicle's exterior light brightness (indicative of reflections), ambient light level, vehicle turn rate (from image information, steering wheel angle, compass, wheel speed, GPS, etc.), lane tracking system, vehicle pitch or yaw, and geographic location or road type (from GPS). Although specific uses for individual parameters may be discussed, the present invention should not be construed as limited to these specific implementations. Rather, the goal of the present invention is to provide a generalized method of light source classification that can be applied to any, or all, of the above listed parameters or additional parameters for use in identifying objects in the images. Finally, the classification of light sources may be supplemented by information from other than the image processing system, such as radar detection of objects, for example.

Figure 12:
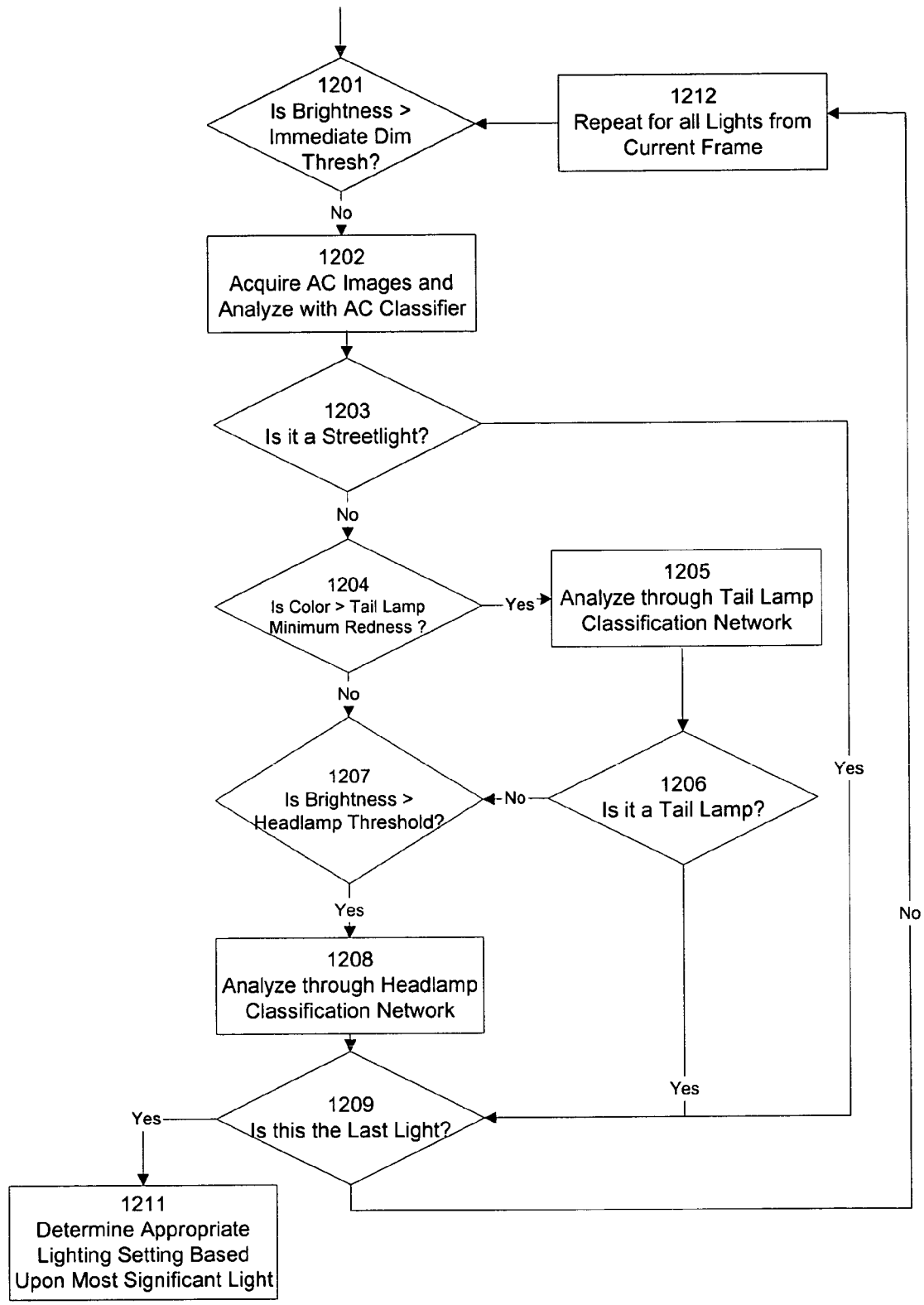
FIG. 12 depicts a flow chart for an algorithm to set the state of an exterior light based upon various light sources in an image.

An example classification scheme proceeds in accordance with FIG. 12. The control sequence of FIG. 12 repeats for each light source identified in the current cycle as indicated in 1212. In the first step 1201, the brightness of the light source is compared to an immediate dim threshold. If the brightness exceeds this threshold, indicating that a very bright light has been detected, the processing of FIG. 12 concludes and the high beams are reduced in brightness, or the beam pattern otherwise modified, if not already off. This feature prevents any possible misclassification of very bright light sources and insures a rapid response to those that are detected.

Step 1202 provides for the discrimination of street lights by detecting a fast flickering in intensity of the light sources, which is not visible to humans, resulting from their AC power source. Vehicular lights, which are powered from a DC source, do not exhibit this flicker. Flicker may be detected by acquiring several images of the region surrounding the light source at a frame rate that is greater than the flicker rate, preferably at 240 Hz and most preferably at 480 Hz. These frames are then analyzed to detect an AC component and those lights exhibiting flicker are ignored (step 1203). Additionally, a count, or average density, of streetlights may be derived to determine if the vehicle is likely traveling in a town or otherwise well lit area. In this case high beam use may be inhibited, or a town lighting mode activated, regardless of the presence of other vehicles. Details of this analysis are provided in previously referenced U.S. patent application Ser. No. 09/800,460, which is incorporated in its entirety herein by reference. An alternative neural network analysis method is discussed in more detail.

A minimum redness threshold criterion is determined with which the color is compared in step 1204. It is assumed that all tail lamps will have a redness that is at least as high as this threshold. Light sources that exhibit redness greater than this threshold are classified through a tail lamp classification network in step 1205. The classification network may take several forms. Most simply, the classification network may contain a set of rules and thresholds to which the properties of the light source is compared. Thresholds for brightness, color, motion and other parameters may be experimentally measured for images of known tail lamps to create these rules. These rules may be determined by examination of the probability distribution function of each of the parameters, or combinations of parameters, for each classification type. Frequently however, the number of variables and the combined effect of multiple variables make generating the appropriate rules complex. For example, the motion vector of a light source may, in itself, not be a useful discriminator of a tail lamp from another light source. A moving vehicle may exhibit the same vertical and horizontal motion as a street sign. However, the motion vector viewed in combination with the position of the light source, the color of the light source, the brightness of the light source, and the speed of the controlled vehicle, for example, may provide an excellent discriminate.

In at least one embodiment, probability functions are employed to classify the individual light sources. The individual probability functions may be first second, third or fourth order equations. Alternatively, the individual probability functions may contain a combination of terms that are derived from either first, second, third or fourth order equations intermixed with one another. In either event, the given probability functions may have unique multiplication weighting factors associated with each term within the given function. The multiplication weighting factors may be statistically derived by analyzing images containing known light sources and, or, obtained during known driving conditions. Alternatively, the multiplication weighting factors may be derived experimentally by analyzing various images and, or, erroneous classifications from empirical data.

The output of the classification network may be either a Boolean, true-false, value indicative of a tail lamp or not a tail lamp or may be a substantially continuous function indicative of the probability of the object being a tail lamp. The same is applicable with regard to headlamps. Substantially continuous output functions are advantageous because they give a measure of confidence that the detected object fits the pattern associated with the properties and behavior of a head lamp or tail lamp. This probability, or confidence measure may be used to variably control the rate of change of the controlled vehicle's exterior lights, with a higher confidence causing a more rapid change. With regard to a two state exterior light, a probability, or confidence, measure threshold other than 0% and 100% may be used to initiate automatic control activity.

In a preferred embodiment, an excellent classification scheme that considers these complex variable relationships is implemented as a neural network. The input to this network are many of the previously mentioned variables that may include, for example, the brightness, color, position, motion vector, and age of the light source along with the vehicle speed and turn rate information if available. More details of the construction of this neural network will be presented herein upon completion of the discussion of the control sequence of FIG. 5. The rules for classification, or the neural network used, may be different if the high beams are off than if they are on. For example, a classification scheme that tends to favor classifying objects as a tail lamp whenever there is doubt may be used if the high beams are off to prevent the possibility of high beams coming on in the presence of another vehicle. However, when high beams are on, higher certainty may be required to prevent nuisance dimming of the high beams. Since the task of classification is simpler and not as critical when high beams are off, a simpler rule based classifier may be used in the off state and a more complex neural network used in the on state.

If the object is identified as a tail lamp in step 1206, the classification process continues for the remaining light sources (1212) until all light sources are classified (1209). If the light source is not a tail lamp, it may be further tested to see if it is a head lamp. Similarly, light sources with redness levels below the threshold in step 1204 are tested to see if they are head lamps. First, in step 1207 the brightness of the light source is checked to determine if it is a candidate for a head lamp. The threshold of step 1207 may be a single threshold or, more preferably, is a function of position of the object, the current controlled vehicle's exterior lighting state, and optionally of the controlled vehicle's speed or other parameters. If the light source is brighter than the threshold, it is tested to determine if it is a head lamp. Step 1208 performs similarly to step 1205, the classification for tail lamps.

The presence of a head lamp may be determined by a set of rules determined through experimentation or, most preferably by a neural network. The output of step 1208 may be a true/false indication of the presence of a headlamp of an oncoming vehicle or a measure of the likelihood that the object is a head lamp of an oncoming vehicle. As with step 1205, the classification in step 1208 may be performed substantially different if the headlamps are on than if they are off. Similarly, the likelihood of an object being a tail lamp of a leading vehicle is determined.

As previously mentioned with regards to steps 1205 and 1208, the present invention preferably utilizes one or more neural networks to classify detected light sources. Detailed descriptions of neural networks and their implementation for classification problems is provided in the books *Neural Networks for Pattern Recognition*, by Christopher M. Bishop and published by Oxford University Press (copyright 1995) and *Practical Neural Network Recipes in* C++, by Timothy Masters and published by Academic Press (copyright 1993). Neural network algorithms may be designed simulated and trained using the software *NeuroSolutions* 4 available from NeuroDimension Inc., located in Gainesville Fla. The text of each of these references is incorporated in its entirety herein by reference.

Figure 13:
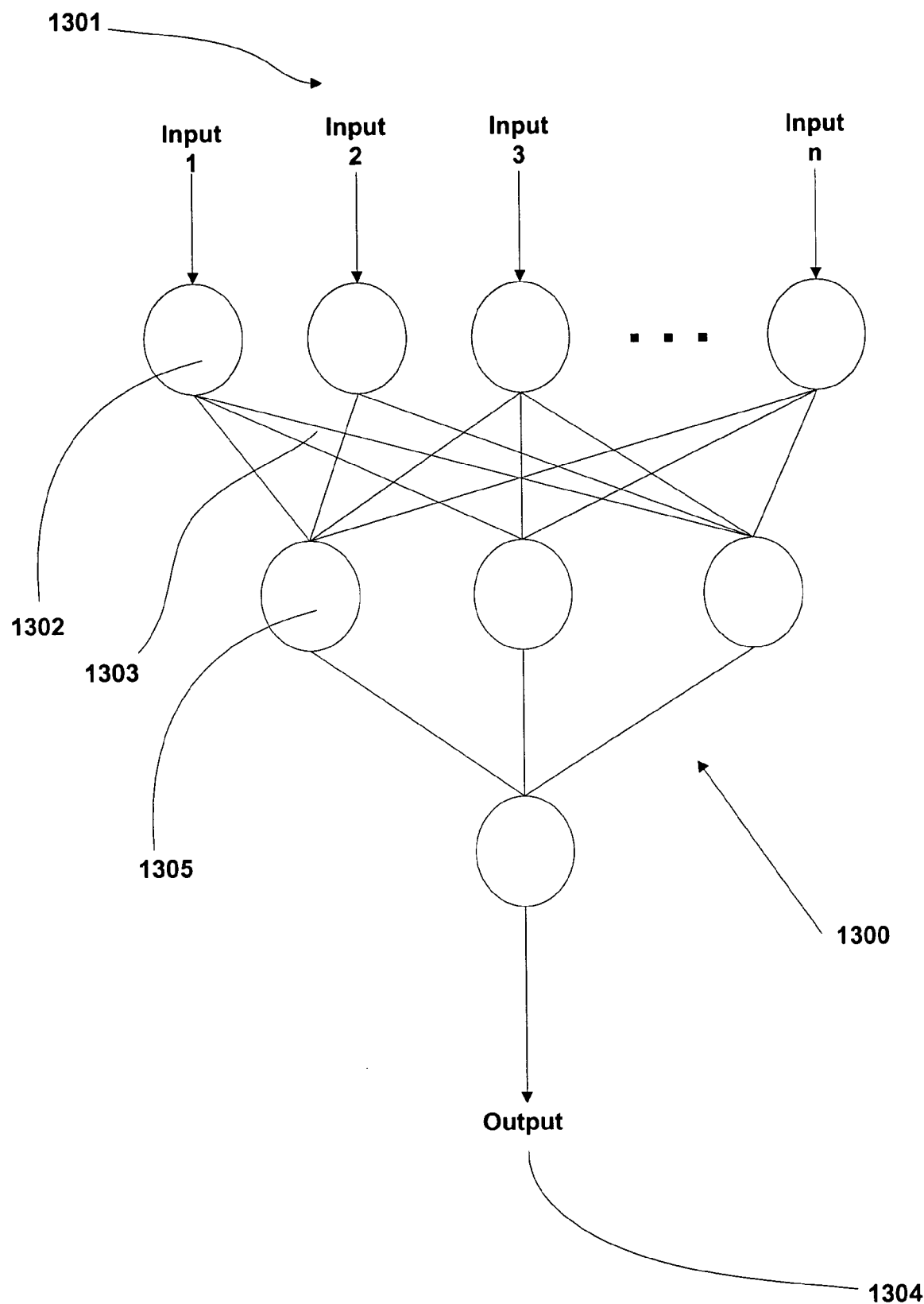
FIG. 13 depicts an example flow chart of a neural network.

A description of an example neural network for use with the present invention is given with reference to FIG. 13. A neural network 1300 may consist of one or more inputs 1301, input neurons 1302, one or more outputs 1304, hidden layer neurons 1305, and connections 1303, connections 1303 are also commonly referred to as synapses. For the purposes herein, the input neurons 1302 represent the parameters used for classification of light sources. The synapses between input neurons 1302 and the first hidden layer neurons 1303 represent weights by which these inputs are multiplied. The neurons 1303 sum these weighted values and apply an activation function to the sum. The activation function is almost always a non-linear function, and is preferably sigmoidal, such as a logistic or hyperbolic tangent function. Next, the output of these neurons is connected to the next layer of neurons by synapses that again represent a weight by which this value is multiplied. Finally, an output neuron provides an output value of the network 1304. The network shown in FIG. 13 is a generalized structure. Any number of input neurons may be used and none or any number of intermediate hidden layers may be used, although only one or two hidden layers are typically necessary. The neural network is shown as fully connected, which means that the output of every neuron in one layer is connected by a synapse to every neuron in the next layer. Neural networks may also be partially connected.

The weight of each of the synapses are set to give the neural network its functionality and set its performance at a given pattern recognition or classification task. Weights are set by "training" the neural network. Training is performed by providing the neural network with numerous classified samples of the data to be classified. In the current invention, numerous light sources are captured by the imaging system, stored, and later manually classified by examining the images. Manual classification may occur by noting the actual type of light source when capturing the data or by later examination of the recorded data. To assist in manual classification additional video may be synchronously captured using a higher resolution or higher sensitivity imaging system. Finally, classification for training may also occur automatically using a more powerful video processing system than used for production deployment. Such an automatic system may use additional information, such as higher resolution video to assist in classification of the objects. In either case, the persons or automatic system used to classify the data which is then used to train a neural network (or used to develop other type of statistical classification algorithms) may be referred to as having "expert knowledge" of the classification problem.

Synapse weights may be initially set randomly and adjusted until the maximum achievable rate of correct classification of the training samples is achieved. Preferably additional manually classified samples are used to test the neural network to insure that it is able to generalize beyond the training data set. The previously mentioned *NeuroSolutions* program may be used to design the neural network and perform the training. Ideally, the minimum complexity neural network that satisfactorily performs the classification task is used to minimize the computational requirements of the system. Additional neurons, hidden layers, and synapses may be added to improve performance if necessary.

Training of the neural network relies on an error function that provides a measure of how correctly the neural network performs the classification task. The goal of the training program is to converge on a set of synapse weights that minimizes the error function. The simplest error function may be a measure of the percentage of time the neural network incorrectly classifies a light source. A more appropriate error function may associate a severity-of-misclassification weight to the training samples. For example, misclassifying a close head lamp as a non-head lamp would be more unacceptable than misclassifying a distant head lamp. Therefore, a higher weight may be placed on these errors. Misclassifying a distant, faint head lamp may be less severe than misclassifying a faint sign because the nuisance dimming may be more objectionable than a slight delay in dimming for a distant headlamp. The error penalty may be manually set for each training sample or may be a function of a light source brightness or other parameter.

Once the neural network has been trained, a recall neural network may be implemented for deployment in the application. The recall neural network has the weights fixed from the training and is usually implemented in software in the processor, although hardware implementations are also possible through a hardware ASIC or programmable logic array. Preferably, great care is taken to train the neural network in the same way that the recall neural network is to be implemented. The activation functions are preferably computed in the same way for training and recall. The numeric precision used is preferably identical. Also, the data used for training should be acquired using image sensors that are substantially identical to, or closely resemble, actual production components. Preferably, training data is acquired utilizing multiple components representative of production variances that may occur in actual devices.

The inputs to the neural network may be the parameters previously mentioned with reference to step 1205 of FIG. 12. While raw values of these parameters may be used, neural network complexity may be reduced by scaling these parameters such that each variable has approximately the same magnitude range. For variables such as the brightness, that potentially has a very large range, it is beneficial to use the log of this value as an input to the neural network. Other values, such as the color ratio may be best expressed as the degree of membership in a fuzzy logic membership set. For example, low red color values may indicate that a light source is certainly not red, therefore, the membership of this value, in a "redness" set, is zero. Intermediate values may indicate partial membership in a "redness" set and indicate that the light source is possibly red but not certainly red. Finally, red values above a threshold indicate complete membership in a "redness" set. Higher measured red color values above this threshold do not imply that the light source has more "redness" since the certainty of the light source being red has been determined. Similarly, red color values above this threshold would not increase the probability of a light source being a tail lamp once full certainty that the light source is red is determined. Thus, the fuzzy redness membership criteria may be a more appropriate input for the neural network than the color value directly. Although, the color value may be used as an input directly.

Another parameter that may be advantageously modified for input to the neural network is the X and Y centroid location coordinates. Typically, these coordinates are set as imager coordinates. However, it may be more useful to present these coordinates to the neural network as a positive or negative distance from the center of the field of view. Since most light sources of interest are located at the center of the image and the motion of most signs emanates outward from the center, a center offset parameter may produce better results or reduce the complexity of the neural network. The image center location from which the X and Y position offset is computed may be adjusted according to vehicle turn rate and, or, vehicle pitch.

The image center location may be set based upon the design intent center or, most preferably, may be dynamically calibrated. Dynamic calibration occurs by monitoring the images for situation when faint, still light sources are alone in the image near the center. When such a situation presents itself it is likely a distant oncoming light or preceding tail lamp is present. A neural network may also be implemented to detect this condition or an additional output of the existing classification network may indicate if the light source is a good classification candidate. Vehicle speed and/or turn rate information may be monitored to insure the vehicle is traveling fairly steadily and is likely not turning. Once a calibration light source is detected, the X and Y coordinates of this light source are averaged with the current image center location. The proportional contribution of the new value is preferably very small, for example less than 1% and most preferably less than 0.1%. However, for a new vehicle larger factor may be used to establish a calibration factor quicker. Once a threshold number of calibration samples have been collected by the new vehicle, the average contribution of subsequent samples is reduced. A recalibrate button sequence may also be provided to force a quick recalibration, which may be desired in cases such as when a windshield is replaced. A manual switch may be provided to enable/disable automatic calibration.

Prior to classification by the classification network, light sources may be first evaluated to insure that they meet a minimum criteria, for example a minimum brightness threshold. If they do not meet this criteria, they are not considered by the classification network. The criteria may include a color range, a position dependent threshold or an age dependent threshold. Faint light sources may be required to reach a certain age before examination, however, bright light sources may be examined earlier. Various combinations of rules may be used to reject or identify light sources prior to the classification network. This is particularly useful when light sources are particularly easy to identify or reject and thus computation time is reduced for these objects.

An example neural network implementation for use with the present invention contains 23 inputs and two continuous outputs, one output for head lamp classification and one output for tail lamp classification. The inputs are as follows: X position (as an offset from center), Y position (as an offset from center), brightness (logarithmically scaled), red-to-clear color ratio, age, width, and height. Also the X position, Y position, brightness, and red-to-clear color ratios from the prior four cycles are inputs, thus totaling 23. All inputs are scaled over their range from −1000 to 1000. Twelve hidden layer neurons are used.

The neural network in this example was trained by driving and recording camera images. Many thousand examples of light sources were extracted from the corresponding images using the techniques described above prior to classification. The light sources were then classified manually. The neural network was trained using *Neural Solutions*. The trained recall network was implemented on a Motorola 68HCS912 microprocessor using 16 bit signed integer arithmetic. Computational efficiency benefited from the inclusion of a multiply-accumulate instruction (MAC) in this processor that was used to compute the input dot products into each network note. Since *Neural Solutions* utilizes floating point mathematics with inputs scaled from −1.0 to 1.0, it was necessary to scale the resulting weights for embedded processing with integer math.

As previously mentioned, other inputs may be used. For example vehicle speed, vehicle turn rate, or the present vehicle lighting condition (such as the duty cycle of the high beam headlights) may be used. In another example, an input indicating the change of brightness of a light source between several cycles is used when there is also a change in the controlled vehicles headlamp's brightness, thus allowing the neural network to detect changes in sign reflections due to the reduction in brightness of the high beam headlights. In yet another embodiment, the actual pixel values from a selected area surrounding the peak of a light source may be used as an input to the neural network, thus allowing detection of the shape or light distribution of the object. This method is particularly useful when processing capabilities allow for large numbers of inputs. When checkerboard or striped filter patterns are used, the inclusion of neighboring pixel values may allow the neural network to infer the color directly from the raw data, rather than separately computing the color ratio.

Once classification of all lights is complete the appropriate lighting state is determined in step 505. It is also possible that classification is aborted and step 505 is invoked due to the detection of a very bright light source, in which case the high beams are reduced in brightness if not already off. If more than one light source is detected, control may be based on the light source that generates the largest response.

A description of various alternate light source classification networks follows the discussion regarding determination of the appropriate controlled vehicle's exterior light state.

The determination of the proper behavior is highly dependent on the particular features of the lighting system to be controlled. In a simple high beam on/off system, high beams are shut off once an oncoming head lamp or preceding tail lamp is detected. To prevent nuisance dimming, a head lamp or tail lamp may need to be detected for a number of images before a switch is made. The amount of delay is preferably a function of the brightness of the light source detected thus allowing for relatively rapid response to bright light sources and a slower response to dimmer light sources. This delay may also be a function of the controlled vehicle's speed. The slower delay may allow signs misdiagnosed as oncoming head lamps to pass before a response is triggered. The age of the light source, determined in 1108, may be used to determine the appropriate response point. Similarly, when high beams are off, the images may be required to be free from vehicle light sources for a threshold number of frames before high beam headlights are automatically reactivated.

In another embodiment, high beam headlights are faded on and off rather than switched abruptly from fully on to fully off and, or, from fully off to fully on. In this case the rate of fading may be dependent on the brightness of the light source detected, and optionally, on the probability of correct classification determined in steps 1205 and 1208. Controlled vehicle speed may also be used in determining the rate of change. In this way, high beam headlights react slowly for dim light sources. This allows for the possibility for high beam headlights to correct and return to bright without startling the driver in the case of a misclassification. If the brightness of the detected oncoming head lamp is high and warrants a rapid reduction in brightness of the controlled vehicle's high beam headlights but the probability of classification is low, high beam headlights may be reduced more gradually. If, in subsequent cycles, the brightness of the object reduces with the reduction in high beam brightness, the object is likely a sign, or other reflection, and high beam headlights can be returned to full brightness, again with little disruption to the driver of the controlled vehicle.

More advanced lighting systems may allow for variable aiming of the head lamps in the horizontal and, or, vertical directions or may allow for arbitrary shaping of the associated beam. Such head lamp systems are described in more detail in co-pending, commonly assigned, U.S. provisional patent application Ser. No. 60/229,762, entitled *Headlamp Control to Prevent Glare*, which is incorporated herein in its entirety by reference. With such systems, the beam pattern can be altered to provide the maximum appropriate illumination for the driver of the controlled vehicle without disrupting to drivers of other vehicles. The principals of the present invention may be applied to such systems by accurately identifying the distance and direction to other vehicular light sources and provide a control signal to modify the aim or pattern of the beam of the controlled vehicle's headlights to prevent glare to other drivers.

It should also be understood that alternative sensing and processing methods or combinations of sensing methods may also be utilized with the present invention including RADAR sensors, laser rangefinders, ultrasonic sensors, stereo vision sensors, and RF inter-vehicle communication. The techniques disclosed for determining the proper lighting state of the controlled vehicle's exterior lights, as a result of the detection of other light sources, may be employed when any one or a combination of these and other sensors are used.

The present invention may be used with exterior lights having a discrete switch point and, or, a substantially continuous transition. Examples of discrete switching lights include: switching between individual high and low beam states by activating different filaments of a lamp, switching between separate high and low beam lamps, activating and deactivating a high beam lamp while a low beam lamp remains activated, and discretely switching an aiming angle of a lamp, or lamps. An additional new lamp technology, called a bi-modal Xenon HID lamp or simply Bi-Xenon, utilizes a mechanically movable shade to modify the beam pattern of a single high-intensity discharge lamp. Examples of continuous switching lights include: varying the voltage to an incandescent filament lamp, varying the PWM duty cycle to a filament lamp, changing the aim of a lamp, variably controlling a mechanical shade or otherwise modifying the beam pattern through a variety of optical techniques. Substantially continuously variable lamps may also include lamps that may transition through a series of discrete steps, rather than lamps that are truly continuous. Finally, new lighting technologies such as those described in commonly assigned U.S. patent application Ser. No. 10/235,476 may include LED headlamps, or lamps wherein the beam pattern is modified through the use of a spatial light modulator, such as a variable attenuator or reflector. Such new lighting technologies may be controlled between discrete states or substantially continuous. The disclosure of this application is incorporated in its entirety herein by reference.

Various embodiments for control of both continuous and discrete switching systems are described with reference to FIG. 14. While under automatic control, vehicle headlamps can be in one of three states: an OFF STATE 1401, a TRANSITION STATE 1402 or the ON STATE 1403. At any time during the automatic operation, manual override may be performed by the driver that can either cause the decisions of the automatic control to be ignored or force the automatic control into either the OFF STATE or the ON STATE. Vehicles having single headlight fixtures that function as low beam and high beam headlights, whether discreetly switched or substantially continuously variable, may be provided with a manual control to select from a multitude of brightness and, or, illumination patterns. As previously mentioned, processing progresses in a cyclic fashion. In each cycle, that may for example take 200 ms, at least one image is acquired and analyzed. After analysis, a decision is made to change states or remain in the current state.

In at least one embodiment, an automatic headlamp control system is configured to control discrete switching headlamps. For the purpose of discussion, headlamp control may begin in the OFF STATE 1401. To leave the OFF STATE, it may be required that several conditions be met. A list of example conditions and the rational for each condition follows below. Various embodiments may implement all, or only some, of the conditions.

Table 1

Figure 15:
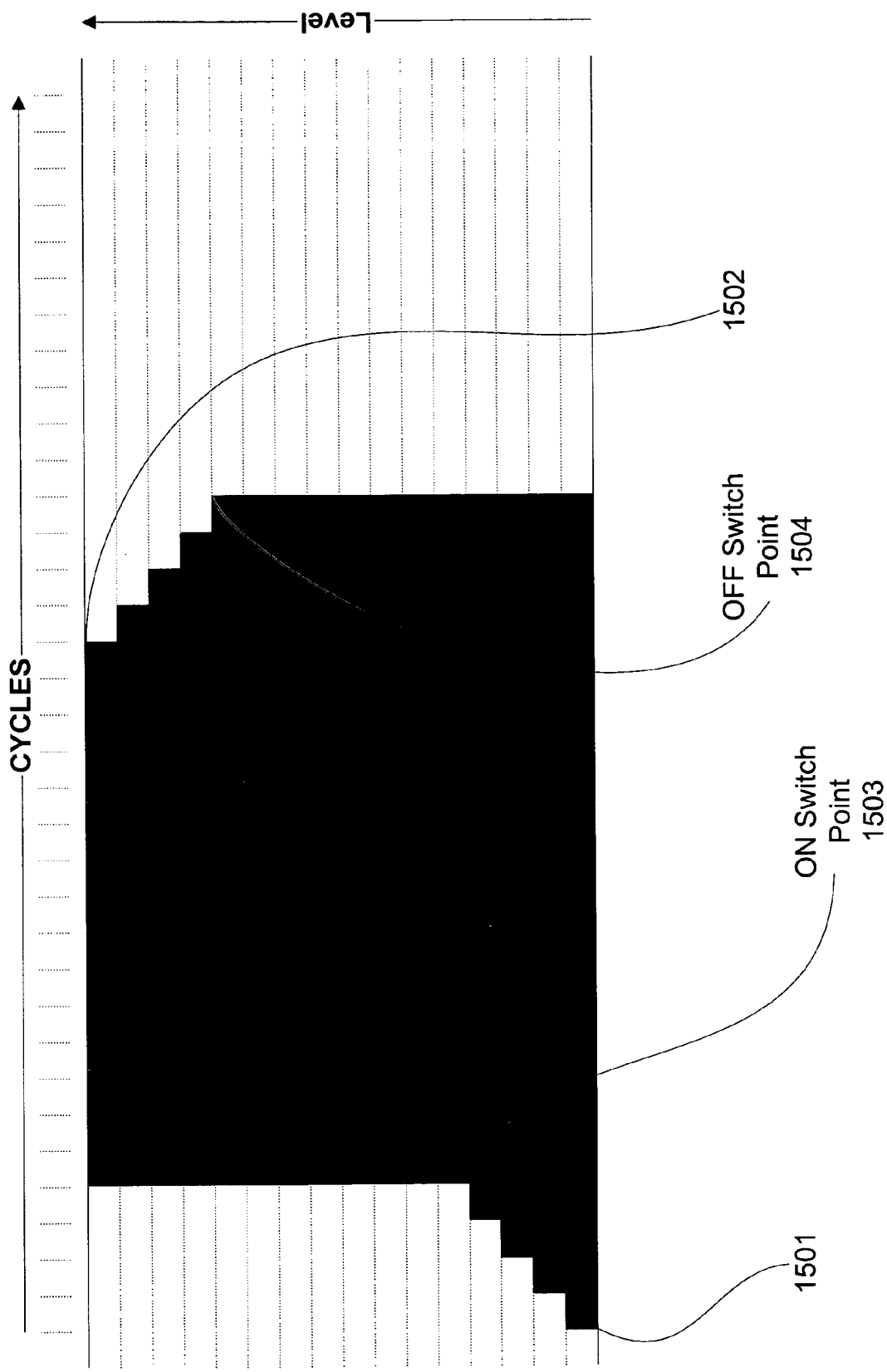
FIG. 15 depicts a first state transition chart for exterior light control.

Once the desired conditions are met, control proceeds from the OFF STATE 1401 to the TRANSITION STATE 1402 as indicated by 1404. Behavior in the TRANSITION STATE 1402 for discrete switching lamps is illustrated in FIG. 15. Beginning discussion with the lamps off, control enters TRANSITION STATE 1402 at point 1501. For each successive cycle in which no other vehicle lights are identified, the level in the transition state is increased. When the level reaches the ON Switch point 1503 the high beams are activated and the control state is set to the ON STATE 1403 through transition 1405. If, during the transition from points 1501 to 1503 other vehicle lights are identified, the transition state level is not increased and may switch directions and begin decreasing.

Once in the ON STATE 1403, an identified light may cause control to move to the TRANSITION STATE 1402 at point 1502 through transition 1407. Subsequent identified lights may cause the transition state level to decrease. The amount by which the transition level is decreased may depend on a variety of factors such as the type of light source identified, the brightness of the light source, the position of the light source and the certainty of classification of the light source. Other factors, such as vehicle speed and steering wheel angle may also influence the rate of decrease in the transition state level. If a cycle is clear of identified light sources, the transition state level will not decrease and may increase. Finally, once the transition state level reaches the OFF Switch point 1504 control proceeds to the OFF STATE 1401 through transition 905 and the lights are deactivated.

As indicated, the degree to which the level is reduced for each image cycle may depend on a variety of factors. Examples of these factors and an explanation of each are provided in TABLE 2. The various factors may be used in combination with each other to determine the net reduction in transition state level. Various embodiments may implement some of all of these factors in different combinations and to varying degrees. In addition to the factors of Table 2, the rate of change in transition level may also depend upon the action taken in prior cycles. For example, if the transition level is currently decreasing, an identified vehicle light may cause a continued decrease. However, the level was increased in the prior cycle, an identified light may cause the increase to halt but not cause an immediate decrease until later cycles. This feature helps limit rapid oscillations which may occur with sign reflections or other nuisances.

TABLE 2

| Factor | Description | Rational |
|---|---|---|
| 1 | Light source brightness | Brighter lights may cause a larger decrease in the transition level and thus a quicker response time due to the likely closeness of the light |
| 2 | Light source position | Lights in the center, and thus exposed to the brightest portion of the controlled vehicle's high beam, may be responded to quicker. |
| 3 | Confidence of Classification | Statistical classification methods, including neural networks, may indicate the probability that given light source is a headlamp or tail lamp. The greater the probability the object is another vehicle light, rather than a reflection of other nuisance light source, the quicker it may be responded to. |
| 4 | Light source type | Headlamps may require quicker response than tail lamps. |
| 5 | Controlled vehicle speed | Response rate may be increased when traveling at higher speeds. This is especially necessary on very high speed roads, such as the German Autobahn, where the rate of approach of to an oncoming or preceding vehicle is high. |
| 6 | Controlled vehicle turn rate | When turning, response rate may be increased for vehicles in the direction of the turn, thus reducing the time those vehicles may be exposed to glare. When traveling on strait roads, it is much more likely that light sources at high horizontal angles are nuisance reflections. |

Under certain circumstances, control may proceed from the OFF STATE 1401 to the ON STATE 1403 directly through transition 1409 or from the ON STATE 1403 to the OFF STATE 1401 directly through transition 1408. Transition 1409 may occur for example to implement a fast-return-to-bright behavior. When traveling in a dark road at modest to high speed, it is desirable to activate high beam headlights as soon as possible after an oncoming vehicle has passed. The lights of the oncoming vehicle will have reduced the controlled vehicle's driver's night vision sensitivity and thus the rapid activation of high beam headlights may help compensate. Additionally, the quick behavior of the automatic system provides a feeling of action and security to the driver and thus is aesthetically pleasing, particularly to drivers of certain vehicles such as sports cars. Transition 1408 directly from the ON STATE 1403 to the OFF STATE 1401 may occur when a very bright light is detected. This provides for the fastest possible response and minimizes any glare to an oncoming or a leading vehicle.

Figure 14:
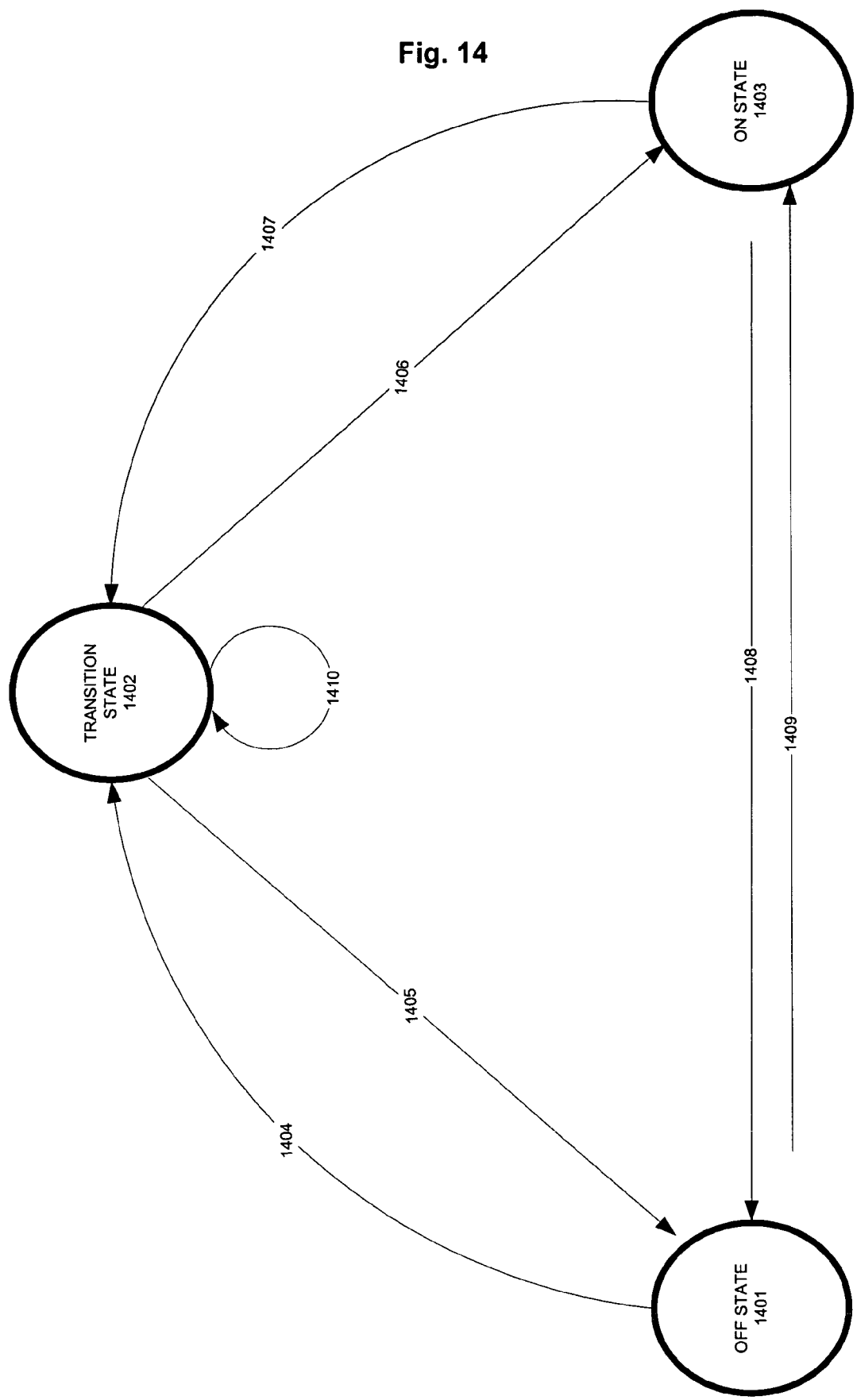
FIG. 14 depicts a state transition flow chart for exterior light control.

In an example embodiment the use of the state diagram of FIG. 14 and the transition level diagram is merely an exemplary implementation of the concepts presented. The concept of the various discrete levels indicated in FIG. 15 is a convenient mechanism for implementing the variable reaction delay to various light sources and the ability for the switch decision to be postponed and reversed when light sources appear and disappear. One skilled in the art may implement the behavior and concepts of the present invention through a variety of means, such as a continuously variable delay timer.

Figure 16:
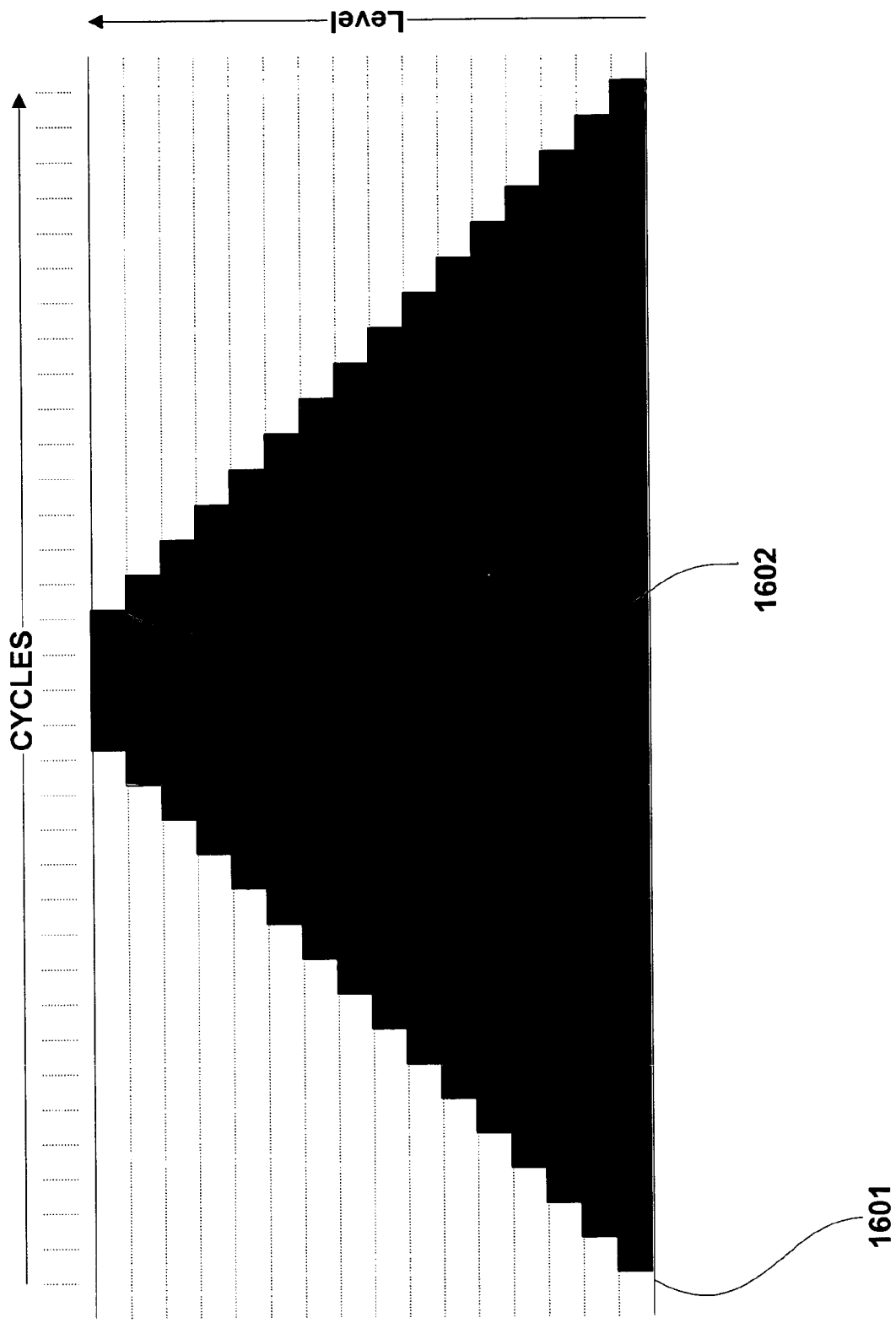
FIG. 16 depicts a second state transition chart for exterior light control.

The mechanism presented in the embodiment for implementing discrete switching light sources can be readily extended to controlling substantially continuously variable light sources as well. The behavior of the states of FIG. 14 remains substantially the same. The levels within transition state 1402 increase and decrease according to the behavior previously described. However, there are no discrete switch on and switch off points. Rather, as shown in FIG. 16, the transition level increases beginning at point 1501, 1601 so long as no vehicles are detected. If high beam headlights are on, and vehicles are detected, transition state may be entered at a high level 1502, 1602 and then decrease. As discussed previously, the transition level change direction may be changed if vehicles appear or disappear while in the transition state 1402. The criteria of TABLE 2 for determining the behavior of transition state 1402 apply to controlling substantially continuously variable lights as well.

Figure 17:
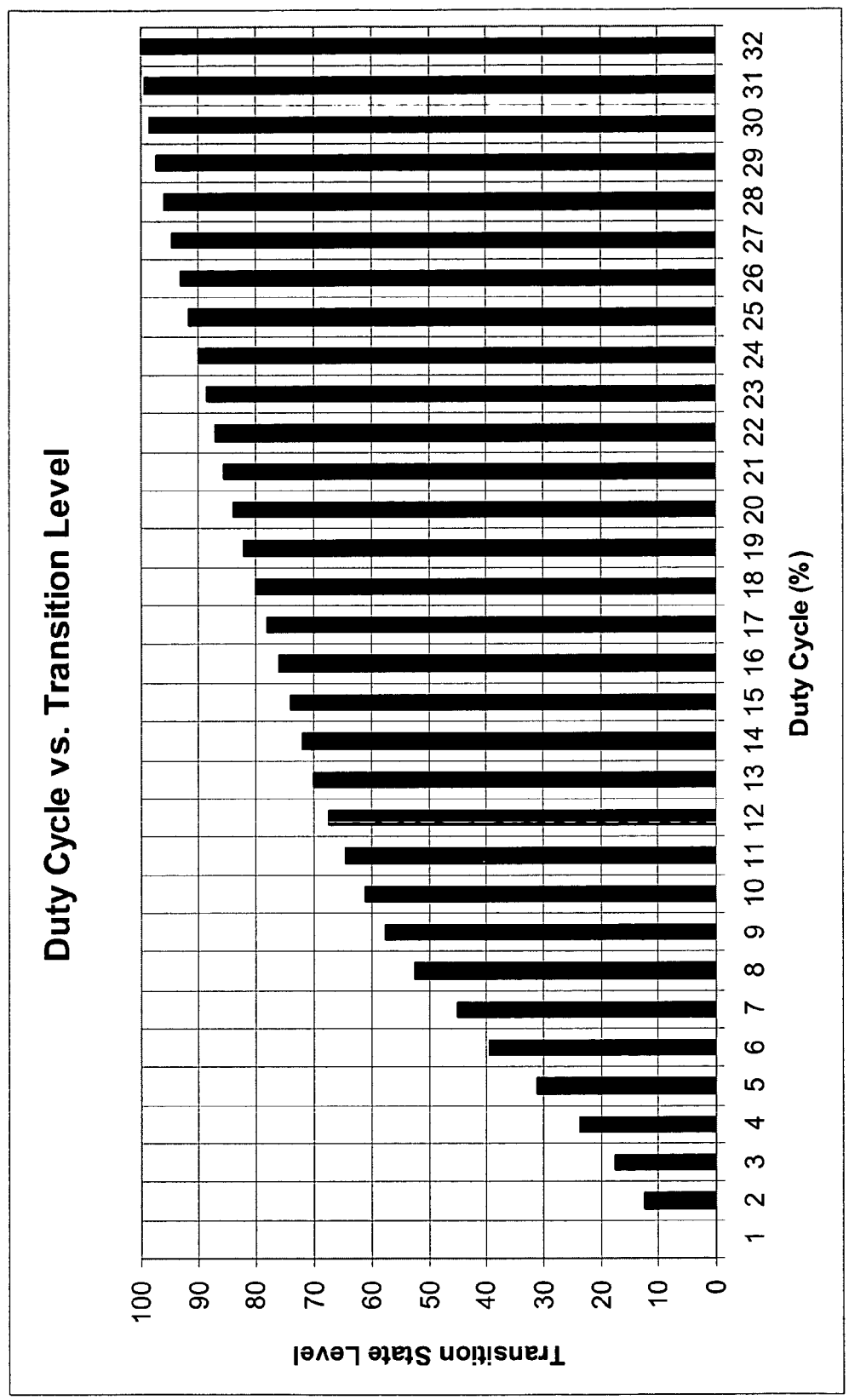
FIG. 17 depicts graph of duty cycle v. transition level for exterior light control.

The current transition level may be use to set the current output level of a substantially continuously variable lamp. For example, as shown in FIG. 17, the transition state level may be used to determine the PWM duty cycle of a halogen headlamp. Different shapes of the plot in FIG. 17 may provide different fading behavior for different types of lamps or to provide a different appearance. The transition state level may alternatively be used to determine the vertical and, or, horizontal angle of a variable aim lamp, or a combination of intensity and angle of a lamp. A different function for FIG. 17 may be use when entering transition state 1402 from the on state 1403 or the off state 1404 to provide differing behaviors for tuning on and off the headlamps. Control of a telltale indicator for the headlamp condition may be provided based upon the transition level. The telltale may be variable with the brightness controlled by a function such as that of FIG. 17 or may have a discrete switch on and off point at particular levels within the transition state 1402.

The implementation of a head lamp network classifier in step 1208 and a tail lamp classifier in step 1207 is only one of many possible implementations of a neural network for the task of automatically controlling vehicle exterior lights. A single neural network may be used with all inputs feeding in and containing two outputs, one for a head lamp, and one for a tail lamp. This neural network will be more complex and computationally demanding, since the classification task is more complex, however, it will likely perform at least as well as two independent neural networks. An even more general case would provide the current controlled vehicle headlight state as an input and output the new headlight state.

If processing power is limited, a larger number of simpler neural networks may be utilized as is the case for FIG. 12 where classification is divided by color ratio. Classification may further be divided by brightness. For example, if a light source is brighter than a threshold and is red a bright tail lamp neural network may be employed to evaluate the object. If it is faint and not red, a faint head lamp neural network may be employed to evaluate the object. Each of these neural networks may be individually designed and trained using data representative of that to which the recall neural network will be exposed during operation. Even further division of the task into various brightness ranges, or by other parameters, is contemplated.

For example, the rear end of many large trucks and truck trailers have a plurality of lights and, or, reflectors. Dependant upon the specific configuration, the rear end of a given truck or trailer may comprise characteristics more closely related to road side signs, reflectors or lighting. Therefore, it may be desirable to provide a neural network specifically configured and trained for identification of the rear end of leading trucks and, or, trailers. A neural network for this task may be trained utilizing image data known to contain specific examples of the rear end of trucks and, or, trailers.

The same neural network techniques may be used to solve other classification and identification problems of this imaging system. For example, the identification of AC lights may be improved through the use of neural networks. In the prior art, the AC ripple is quantified my computing the magnitude of the 120 Hz Fourier series component present in the image samples. Neural networks are especially useful for identifying patterns in noisy data. Rather than compute the Fourier series, the brightness of the light in each of the rapidly sampled images may be presented as an input to the neural network. The output of the neural network may be a Boolean value indicative of a street light or a continuous value that may be further fed into the head lamp classification network, for example. Other parameters, such as the vertical motion and, or, the position of the light source may also be presented to a neural network to further confirm if the object is likely a street light. An AC light neural network may be trained by providing high-frame-rate image samples, or the sums of pixels imaging the streetlight from each image, of both streetlights and other lights to the neural network. Once trained, the recall neural network may be provided to implement step 1202 of FIG. 12.

Recently, LED tail lamps have become commercially available. These tail lamps may have their brightness controlled by pulse width modulation at frequencies comparable to those of AC streetlights lights. Thus, the above technique may mistakenly determine a LED tail lamp to be a street light. The color of the light may be used to distinguish red tail lamps from streetlights, even when both exhibit an intensity modulation. This problem is further complicated by the fact that the color of the light source may be incorrectly determined by the original image since the image may be taken at various phases of the tail lamps brightness modulation. In this case, the rapidly acquired images used for AC analysis may also be used to determine color. Images of both red filtered and clear pixels are acquired. If the light source is determined to have a high AC flicker, a new color ratio is computed from the sum of all the pixels from the red filtered images and the sum of all the clear pixels, thus insuring that images covering the entire modulation period are used. Lights that are substantially red are then not identified as street lights.

Another potential source of false dimming is the presence of overhead flashing street signals. The flashing property of these signals may be determined by storing the brightness of the light sources for several cycles. At a 200 ms cycle rate, 5 cycles worth of brightness history is sufficient. The periodic change in brightness of these objects is indicative of their flashing. While the flashing may be determined simply by examining the rate of change in brightness of the light source, a neural network may perform the task more accurately. In this case, a neural network may be designed with the brightness levels of the light source in a current and at least one prior image as inputs. The output of the neural network may be a Boolean value indicative of whether, or not, the light source is flashing. The output of the neural network may also be fed into the head lamp and, or, tail lamp classification neural network. This may be especially important because the neural network may take into account other factors, such as the position of the light source in determining if the light source is an overhead flasher rather than, for example, a turn signal of a preceding vehicle. All neural networks may be trained using examples of both overhead flashers and other light sources, including preceding vehicle turn signals.

In yet another embodiment a neural network may be used to correct for false dimming from sign reflections. Occasionally, despite every effort to prevent such misclassification, the reflection of the controlled vehicle's lamps off of a sign, or other object, may falsely be detected as a light of an oncoming or leading vehicle. When this occurs, the controlled vehicle's high beam headlights will be dimmed and the brightness of the reflection off of the sign will be reduced. If this reduction is detected, the high beam headlights of the controlled vehicle may be returned to full bright with little or no disruption to the driver of the controlled vehicle. This task is complicated by the fact that the brightness of the reflection off of the sign may be simultaneously increasing due to the closing distance between the vehicle and the sign at a rate proportional to the square of the controlled vehicle's speed. While this relationship can be computed and detected analytically, the variety of conditions present and the noise inherent in the system, due to bumpy roads or other factors, makes identification of this correlation between the controlled vehicle's high beam headlight brightness and sign reflection brightness an ideal problem for solution by a neural network.

The neural network for this purpose may be utilized when the high beam headlights of the controlled vehicle are in the process of fading off. As with the flasher detection scheme discussed above, the brightness of a light source over a few prior cycles is stored. These brightness values, along with the brightness of the controlled vehicle's high beam headlights and speed may be fed into the neural network. The neural network may be trained using various conditions when the high beams are reduced in brightness both due to sign reflection and due to proper responses to oncoming head lamps and preceding tail lamps. These samples are manually classified as either correct responses or sign responses. The output of the neural network may either be a Boolean value indicating that the object is a sign or an output that is fed into the head lamp and or, tail lamp classification networks, in which case special head lamp and tail lamp classification neural networks may be provided for cases when the controlled vehicle's high beam headlights are in transition.

In the prior examples of uses of neural networks with the present invention, various parameters computed in either the object extraction process 502 or the parent identification process 503, along with vehicle state parameters may be used as inputs to the neural network. While this method is likely the most computationally efficient, and provides excellent results, it is also contemplated to use raw image data from either the original images or the synthesized HDR images as inputs to the neural network. The most extreme example of this would be to feed the entire image into a neural network with each pixel as an individual input neuron. Historical information may be obtained by presenting multiple images to the neural network or by feeding some stored neural network outputs from the previous cycle into additional inputs for the current cycle, thus creating a neural network with a temporal dimension. As long as a set of training images is manually classified as containing light sources of interest, such a technique could be made to function. However, the computational and memory requirements would far exceed those of other embodiments of the present invention. The inventors do not discount the rapid evolution in processing capability, therefore, present this option as a possible embodiment useful either at a future time or for applications that are not economically constrained.

A more computationally reasonable application where image pixel information is fed directly into a neural network uses an image kernel. An image kernel refers to an operation that is typically performed on a small subset of pixels within the image at a time. The kernel is typically raster scanned across the image such that the kernel may be temporarily centered on every pixel within the image. For example, consider a 3×3 kernel in which the currently visited pixel, along with its four orthogonal neighbors and four diagonal neighbors are inputs to the operation. The output of the kernel is one or more values indicative of some feature of this small group of pixels. In the present invention, the kernel may be a neural network with nine inputs, one for the visited pixel and eight for its closest neighbors. The outputs may be, for example, a Boolean value identifying whether the pixel is a peak and, or, a continuous value indicative of the brightness of the source. Thus, a neural network can be programmed to perform the peak detection function of step 502 in FIG. 5. A set of training data containing a wide variety of image segments the size of the kernel, both containing peaks and non-peaks, may be provided along with the desired value for total brightness. Neural network kernels of various sizes may be used. Kernels may be scanned across the image pixel-by-pixel or skip across in jumps the size of the kernel. Also, the kernel may only be applied to pixels that are lit, or pixels that are greater than their neighbors, to save the computation time of applying the kernel to all pixels. Finally, a kernel may be applied to a pixel that has already been identified as a peak and its surrounding neighbors for the purpose of classifying the type of light source associated with the peak.

A neural network may be designed and trained during the development stage of the product and only a fixed recall neural network is implemented in the final product. It is also envisioned that additional training may be provided in the final product. For example, if the control system fails to identify an oncoming head lamp or preceding tail lamp, the driver is likely to override the system manually. If a manual override intervention occurs, the neural network has the potential to learn from this event. If it is clear that a light source was detected during the override event but misclassified or otherwise determined not to be of interest the weights of the neural network may be automatically modified to prevent the same misclassification from occurring again. If the light source was properly classified but the driver still manually dimmed the high beam headlights, for example, it may be determined that the driver prefers a more rapid response to other traffic and the neural network weights, high beam headlight switching rates, or system sensitivity thresholds may be automatically modified accordingly. It is envisioned that a series of user selectable inputs, for example manual switches or options configurable through a multi-function driver information center, may be provided to adjust any given, or all, neural network weighting factors.

In at least one embodiment, the imaged scene may be divided into a plurality of regions. Light sources detected in a given region may be analyzed with a different probability function or neural network than light sources detected in other regions. For example, the imaged scene may be divided into nine regions. In right hand drive situations, it would be more likely that light sources to the right of center would be reflections off signs, roadside reflectors or roadway lighting. Again for right hand drive situations, it would be more likely that light sources to the left of center would be oncoming vehicles. Light sources detected near the center of the image may be similar for right hand and left hand drive countries. Similar general characteristics may be attached to the upper and lower portions of each region. It may be advantageous to divide the imaged scene into three regions from side to side or from top to bottom.

In a system that divides the imaged scene into nine regions, it may be advantages to attach a higher multiplication weighting factor to light source motion and, or, size in the side regions compared to the center region and a higher multiplication weighting factor to light source color and, or, brightness in the center region compared to the side regions. When neural networks are employed within a system having individual regions, the neural networks for each region may be trained with data uniquely associated with the given region.

It is anticipated that different networks may need to be developed and trained for different vehicles or different driving situations. For example, many of the positional and motion discriminates will be different for right-hand drive and left-hand drive countries. Different countries may use different types and colors of street signs. Finally, different vehicles, with different head lamp types may perform differently. The associated neural networks may be trained independently using a training data set representative of the specific vehicle and, or, specific road conditions in which the vehicle will be operated. Ideally, to simply the logistics of maintaining a large software base, the number of configurations may be kept minimal and thus a widely representative training sample base from many geographic regions and, or, various vehicles are used.

When different neural networks are necessary, it is useful to store all configurations within the program memory of the processor and switch to the appropriate neural network automatically. For example, a GPS could be used to determine the region in which the vehicle is being driven and switch to a neural network trained for these driving conditions. The driver may also set the current driving region through a menu or other switch setting. The vehicle may announce its model over the vehicle bus and the appropriate neural network selected. Right-hand and left-hand driving conditions may be identified by monitoring the prevalent position and motion of light sources for an initial period. In right lane drive countries head lamps will appear in the left of the image and move leftward as they approach. The reverse will be true in left lane drive countries. Road marking may also be used to identify these situations.

The examples stated herein should not be construed as limiting the present invention to the specific embodiments described. The present invention should not be construed as limited to any particular neural network structure, any particular statistical algorithm, or any particular combination of inputs or outputs. Many small, or few large, neural networks may be combined in a variety of ways within the spirit of the present invention to provide a method of identifying and classifying light sources within the images. Similarly, it should be understood that individual probability functions may be employed. The individual probability functions may comprise unique statistical analysis or may be a subset of other probability functions. It should also be understood that various aspects of the present invention may be utilized independently of other aspects of the invention. For example, each of the steps depicted in FIG. 5 may be utilized independently with other steps and in a different order or different configuration than presented. It is also anticipated that various useful aspects of the prior art, when combined with aspects of the present invention may function adequately towards the achievement of the goals of the present invention.

In addition to providing a method for identification and classification of light sources for vehicle lighting control, various aspects of the present invention may be useful for other purposes, both for vehicular control functions or for other imaging and non-imaging applications. For example, consider a rain sensor that detects the level of moisture on a vehicle windshield and automatically activates the vehicle's windshield wipers accordingly. Such devices may utilize an imaging system to acquire an image of the surface of the windshield and analyze the image for the presence of rain. Examples of such systems are contained in commonly assigned U.S. Pat. No. 5,923,027 entitled *Moisture sensor and windshield fog detector using an image sensor* and U.S. patent application Ser. No. 09/970,728 entitled *Moisture sen-*

*sor and windshield fog detector*, both of which are incorporated in their entirety herein by reference.

As an alternative to the methods proposed by the prior art, a neural network kernel as described above may be used to identify the presence of a rain drop within the image. The kernel may operate on a small sub-window, for example a 5×5 pixel region and provide an output indicative of the presence in the image of a rain drop within that region. The neural network may be trained by providing the neural network with many classified image segments some of which contain rain drops and others that do not. As an alternative to the use of a kernel, objects or peaks may be extracted from the image using techniques such as a seed-fill, or peak detect, algorithm and the properties of these objects fed into a neural network.

A difficulty of such moisture detection systems relates to the discrimination between background objects from the scene forward of the controlled vehicle and objects at close range on the windshield. The prior art attempts to solve this problem by providing an optical system configured to blur distant objects while focusing near objects. While such a configuration is largely successful, occasionally bright light sources, such as oncoming head lamps, saturate the image causing irregularities that may be mistaken as rain drops. The synthetic HDR image acquisition and synthesis technique may serve to alleviate this problem. Also, fixed pattern noise may prove another source of problem for rain sensors that can be overcome by the fixed pattern noise correction technique presented herein.

Another method of distinguishing between rain drops and background objects is to track the location of the objects overtime in a fashion similar to that presented herein for tracing the motion of light sources. Rain drops are likely to not move in the image while most objects in the foreground will move. This distinction further aids to discriminate between rain drops and other objects.

Yet another method to distinguish rain drops from other objects involves taking two images, one lit with a light source, such as an LED, and one without. The LED is positioned such that light from the LED scattering from the rain drops can be imaged by the imager. Two images are taken, one with the LED on and one with the LED off. The difference of the two images is used to identify rain drops. Alternatively, both images may be processed but only objects that appear only when the LED is on are considered rain drops. Discrimination may be further enhanced by providing a filter for the imager that only allows light of the approximate wavelength of the LED to be transmitted and imaged.

Such a rain sensors may be provided by utilizing a single image sensor to perform both exterior light control and rain sensing functions. Alternatively separate image sensors with separate lenses may be used for each function. In this case the two functions may benefit by sharing many components such as a microcontroller, memory, LVDS SPI interface, circuit board, power supply, oscillator, cables and interconnects, mechanical mounting structures, and others. Both functions, and potentially other imaging functions, may be provided together in a vehicle rear-view mirror. The cameras may share a common electrical bus, as described in commonly assigned U.S. Patent Application publication number 2002/0156559 and Provisional U.S. patent application Ser. No. 60/404,879, the disclosure of which is incorporated herein in its entirety by reference. Output from the rain sensor may be used to further enhance the exterior light control function. The rain sensor may indicate that the windshield is either wet or foggy and thus automatic exterior light control should be suspended. Fog lights or other foul weather lights may be activated. Of course, either function may be provided alone either within a rearview mirror or elsewhere.

The present invention has been described as incorporating an electrochromic mirror element within the mirror housing of the inventive rearview mirror assembly. It will be appreciated by those skilled in the art that various other vehicle accessories and components may be incorporated in the rearview mirror assembly in whole or in part and in various combinations. Such vehicle accessories and components may be mounted within, on or to the mirror housing, the mirror mount, an attachment to the mirror mount or housing, or in a console or other housing associated with the rearview mirror assembly. Additionally, any such vehicle accessories may share components with one another, such as processors, sensors, power supplies, wire harnesses and plugs, displays, switches, antennae, etc. Examples of other vehicle accessories, components or features are described further herein.

Figure 18:
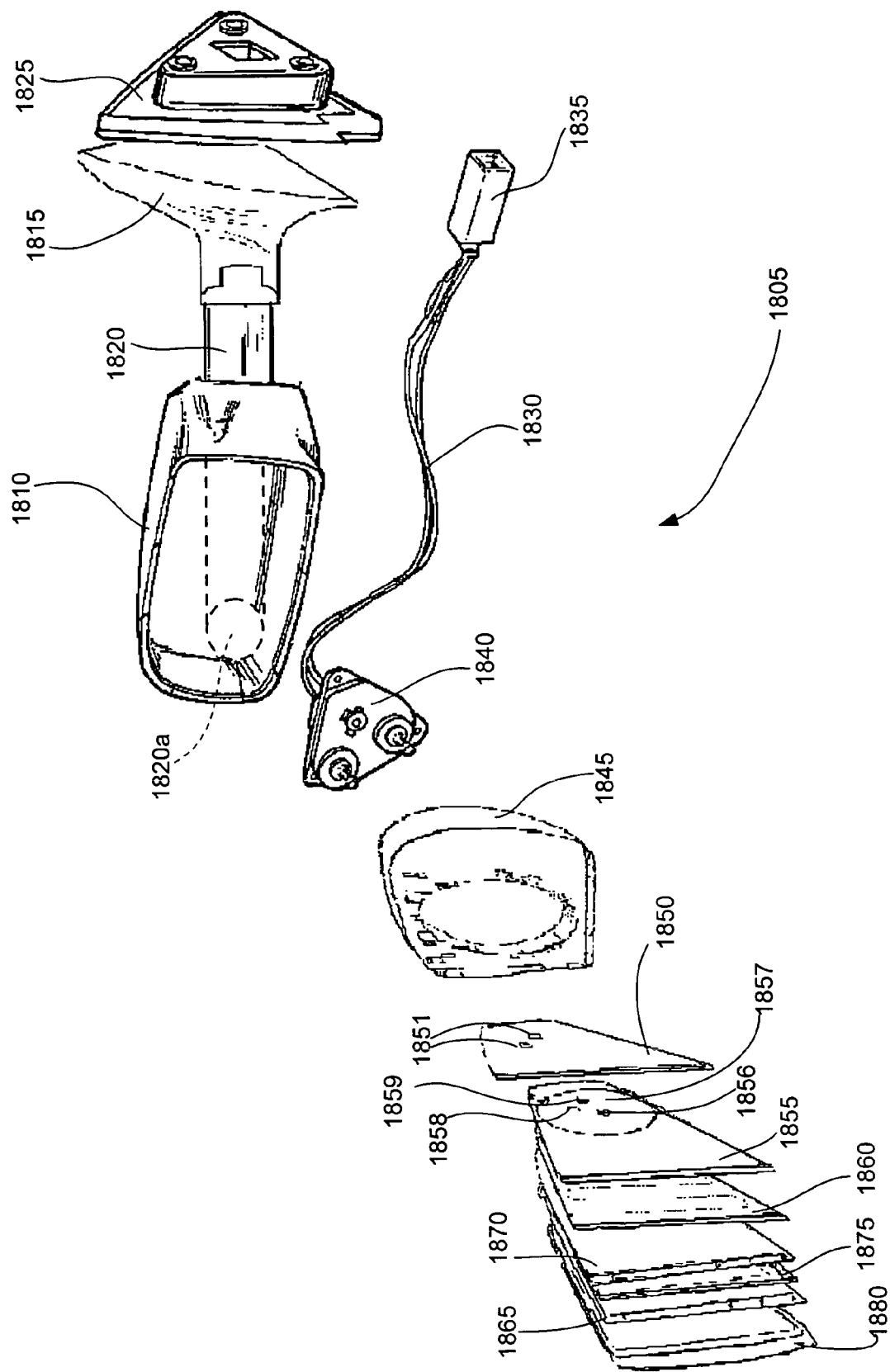
FIG. 18 depicts an exploded view of an exterior rearview mirror assembly.

Turning now to FIG. 18, there is shown an exploded view of an exterior rearview mirror assembly 1805 having a housing 1810 connected to an attachment member 1815 via a telescoping extension 1820. In at least one embodiment, the telescoping extension 1820 comprises a single arm having a linear actuator for extending and retracting the telescoping extension from within the associated vehicle. The telescoping extension 1820 may comprise a rack and pinion type linear actuator, an electrical solenoid type linear actuator, a pneumatic piston or a hydraulic actuator. The housing 1810 may be configured such that the housing axially pivots about the telescoping extension. Additionally, the telescoping extension may be configured such that the housing may be folded inward toward the associated vehicle and outward away from the associated vehicle. The attachment member 1815 is configured to be received by a vehicle mount 1825. The vehicle mount may be fixed to a door panel, an A-pillar, a front fender, a window assembly, or any other position where a driver can view the scene generally rearward of the associated vehicle. It should be understood that the telescoping extension may comprise two or more arms and that the housing may be configured to pivot and fold irrespective of the number of arms employed. It should also be understood that the housing may be connected to a non-telescoping extension at a location shown as reference number 1820*a* such that the housing pivots about the connection 1820*a* such that the mirror may be positioned closer or farther from the vehicle as desired; this feature may be accompanied by a power positioning mechanism such that actuation may be performed inside the vehicle. It should be understood that the mirror housing, extension and attachment member may be configured such that the telescoping, pivoting and folding requires a manual operation.

A wiring harness 1830 with a connecter 1835 is provided to interface the exterior mirror with associated apparatus located inside the associated vehicle. The wiring harness may be configured to provide extension, folding and pivoting of the housing and may also be configured to provide reflective element control, electrical power, turn signal actuation, mirror heater control, mirror element positioning, light sensor interface, exterior mirror circuit board interface, transceiver interface, information display interface, antenna interface, light source power and control, emergency flasher interface, and all other electrical features as described herein. It should be understood that operator interfaces are provided within the vehicle for each of these features where appropriate.

A mirror element positioner 1840 is provided for aligning the associated reflective element within the housing from the interior of the associated vehicle. It should be understood that a corresponding operator interface is provided within the vehicle for positioning of the reflective element.

The positioner 1840 is mechanically connected to a carrier for providing a secure structure for supporting and moving of the associated reflective element. Examples of suitable carriers are described in U.S. Pat. Nos. 6,195,194 and 6,239,899, the disclosures of which are incorporated herein in their entireties by reference.

In at least one embodiment, a double sided adhesive foam 1850 is employed to attach the reflective element to the carrier. In certain instances, apertures 1851 may be provided in the double sided adhesive foam for accommodating positioning of various components.

In at least one embodiment, an electrical circuit board 1855 is provided in the rearview mirror assembly. The electrical circuit board may comprise a light source such as a turn signal light, a keyhole illuminator, or an outside door area illuminator, as taught in U.S. Pat. No. 6,441,943, the entire disclosure of which is incorporated in its entirety herein by reference, an information display, an antenna, a transceiver, a reflective element control, an outside mirror communication system, a remote keyless entry system, proximity sensors, and interfaces for other apparatus described herein. U.S. Pat. Nos. 6,244,716, 6,523,976, 6,521,916, 6,441,943, 6,335,548, 6,132,072, 5,803,579, 6,229,435, 6,504,142, 6,402,328, 6,379,013, and 6,359,274 disclose various electrical components and electrical circuit boards that may be employed in one or more embodiments, the disclosures of each of each of these U.S. Patents are incorporated herein in their entireties by reference.

In at least one embodiment, a rearview mirror assembly is provided with a heater 1860 for improving the operation of the device and for melting frozen precipitation that may be present. Examples of various heaters are disclosed in U.S. Pat. Nos. 5,151,824, 6,244,716, 6,426,485, 6,441,943 and 6,356,376, the disclosures of each of these Patents are incorporated in their entireties herein by reference.

In at least one embodiment, the reflective element is has variable reflectance feature. The variable reflectance reflective element may comprise a first substrate 1865 and a second substrate 1870 secured in a spaced apart relationship by a seal 1875 to define a chamber therebetween. The reflective element may be configured to define a convex element, an aspheric element, a planar element, a non-planar element, a wide field of view element, or a combination of these various configurations in different areas to define a complex mirror element shape. The first surface of the first substrate may comprise a hydrophilic or hydrophobic coating to improve the operation. The reflective element may comprise transflective properties such that a light source, or information display, may be positioned behind the element and project light rays therethrough. The reflective element may comprise an anti-scratch layer, or layers, on the exposed surfaces of the first and, or, second substrates. The reflective element may comprise area(s) that are devoid of reflective material, such as etched in bars or words, to define information display area(s). Examples of various reflective elements are described in U.S. Pat. Nos. 5,682,267, 5,689,370, 6,064,509, 6,062,920, 6,268,950, 6,195,194, 5,940,201, 6,246,507, 6,057,956, 6,512,624, 6,356,376, 6,166,848, 6,111,684, 6,193,378, 6,239,898, 6,441,943, 6,037,471, 6,020,987, 5,825,527 6,111,684 and 5,998,617, the disclosures of each of these Patents are incorporated in their entireties herein by reference.

Preferably the chamber contains an electrochromic medium. Electrochromic medium is preferably capable of selectively attenuating light traveling therethrough and preferably has at least one solution-phase electrochromic material and preferably at least one additional electroactive material that may be solution-phase, surface-confined, or one that plates out onto a surface. However, the presently preferred media are solution-phase redox electrochromics, such as those disclosed in commonly assigned U.S. Pat. Nos. 4,902,108, 5,128,799, 5,278,693, 5,280,380, 5,282,077, 5,294,376, 5,336,448, 5,808,778 and 6,020,987; the entire disclosures of which are incorporated herein in their entireties by reference. If a solution-phase electrochromic medium is utilized, it may be inserted into the chamber through a sealable fill port through well-known techniques, such as vacuum backfilling and the like.

Electrochromic medium preferably includes electrochromic anodic and cathodic materials that can be grouped into the following categories:

Single layer—the electrochromic medium is a single layer of material which may include small inhomogeneous regions and includes solution-phase devices where a material is contained in solution in the ionically conducting electrolyte and remains in solution in the electrolyte when electrochemically oxidized or reduced. U.S. patent application Ser. No. 09/034,531 entitled "NEAR INFRARED-ABSORBING ELECTROCHROMIC COMPOUNDS AND DEVICES COMPRISING SAME"; U.S. patent application Ser. No. 09/377,455 entitled "COLOR STABILIZED ELECTROCHROMIC DEVICES"; U.S. patent application Ser. No. 09/454,043 entitled "ANODIC ELECTROCHROMIC MATERIAL HAVING A SOLUBILIZING MOIETY"; U.S. patent application Ser. No. 09/302,866 entitled "ELECTROCHROMIC MEDIA WITH CONCENTRATION ENHANCED STABILITY PROCESS FOR PREPARATION THEREOF AND USE IN ELECTROCHROMIC DEVICE"; U.S. patent application Ser. No. 09/366,115 entitled "ELECTROCHROMIC MATERIALS WITH ENHANCED ULTRAVIOLET STABILITY"; U.S. patent application Ser. No. 09/677,689 entitled "SUBSTITUTED METALLOCENES FOR USE AS AN ANODIC ELECTROCHROMIC MATERIAL AND ELECTROCHROMIC MEDIA AND DEVICES COMPRISING SAME"; and U.S. patent application Ser. No. 09/350,879 entitled "COUPLED ELECTROCHROMIC COMPOUNDS WITH PHOTOSTABLE DICATION OXIDATION STATES" disclose anodic and cathodic materials that may be used in a single layer electrochromic medium, the entire disclosures of which are incorporated herein by reference. Solution-phase electroactive materials may be contained in the continuous solution phase of a cross-linked polymer matrix in accordance with the teachings of U.S. Pat. No. 5,928,572, entitled "IMPROVED ELECTROCHROMIC LAYER AND DEVICES COMPRISING SAME" or International Patent Application No. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," the entire disclosures of which are incorporated herein by reference.

At least three electroactive materials, at least two of which are electrochromic, can be combined to give a pre-selected color as described in U.S. Pat. No. 6,020,987 entitled "ELECTROCHROMIC MEDIUM CAPABLE OF PRODUCING A PRE-SELECTED COLOR," the entire disclosure of which is incorporated herein by reference. This ability to select the color of the electrochromic medium is particularly advantageous when designing information displays with associated elements.

The anodic and cathodic materials can be combined or linked by a bridging unit as described in International Application No. PCT/WO97/EP498 entitled "ELECTROCHROMIC SYSTEM," the entire disclosure of which is incorporated herein by reference. It is also possible to link anodic materials or cathodic materials by similar methods. The concepts described in these applications can further be combined to yield a variety of electrochromic materials that are linked.

Additionally, a single layer medium includes the medium where the anodic and cathodic materials can be incorporated into the polymer matrix as described in International Application No. PCT/WO98/EP3862 entitled "ELECTROCHROMIC POLYMER SYSTEM," U.S. Pat. No. 6,002,511, or International Patent Application No. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," the entire disclosures of which are incorporated herein by reference.

Also included is a medium where one or more materials in the medium undergoes a change in phase during the operation of the device, for example, a deposition system where a material contained in solution in the tonically conducting electrolyte which forms a layer, or partial layer on the electronically conducting electrode when electrochemically oxidized or reduced.

(ii) Multilayer—the medium is made up in layers and includes at least one material attached directly to an electronically conducting electrode or confined in close proximity thereto which remains attached or confined when electrochemically oxidized or reduced. Examples of this type of electrochromic medium are the metal oxide films, such as tungsten oxide, iridium oxide, nickel oxide, and vanadium oxide. A medium, which contains one or more organic electrochromic layers, such as polythiophene, polyaniline, or polypyrrole attached to the electrode, would also be considered a multilayer medium.

In addition, the electrochromic medium may also contain other materials, such as light absorbers, light stabilizers, thermal stabilizers, antioxidants, thickeners, or viscosity modifiers.

It may be desirable to incorporate a gel into the electrochromic device as disclosed in commonly assigned U.S. Pat. No. 5,940,201 entitled "AN ELECTROCHROMIC MIRROR WITH TWO THIN GLASS ELEMENTS AND A GELLED ELECTROCHROMIC MEDIUM," filed on Apr. 2, 1997. The entire disclosure of this U.S. patent is incorporated herein by reference.

In at least one embodiment, a rearview mirror assembly is provided with an electro-optic element having a substantially transparent seal. Examples of substantially transparent seals and methods of forming substantially transparent seals are provided in U.S. Pat. No. 5,790,298, the entire disclosure of which is included herein by reference.

In at least one embodiment, the rearview mirror assembly is provided with a bezel 1880 for protecting the associated seal from damaging light rays and to provide an aesthetically pleasing appearance. Examples of various bezels are disclosed in U.S. Pat. Nos. 5,448,397, 6,102,546, 6,195,194, 5,923,457, 6,238,898, 6,170,956 and 6,471,362, the disclosures of which are incorporated herein in their entireties by reference.

Figure 19:
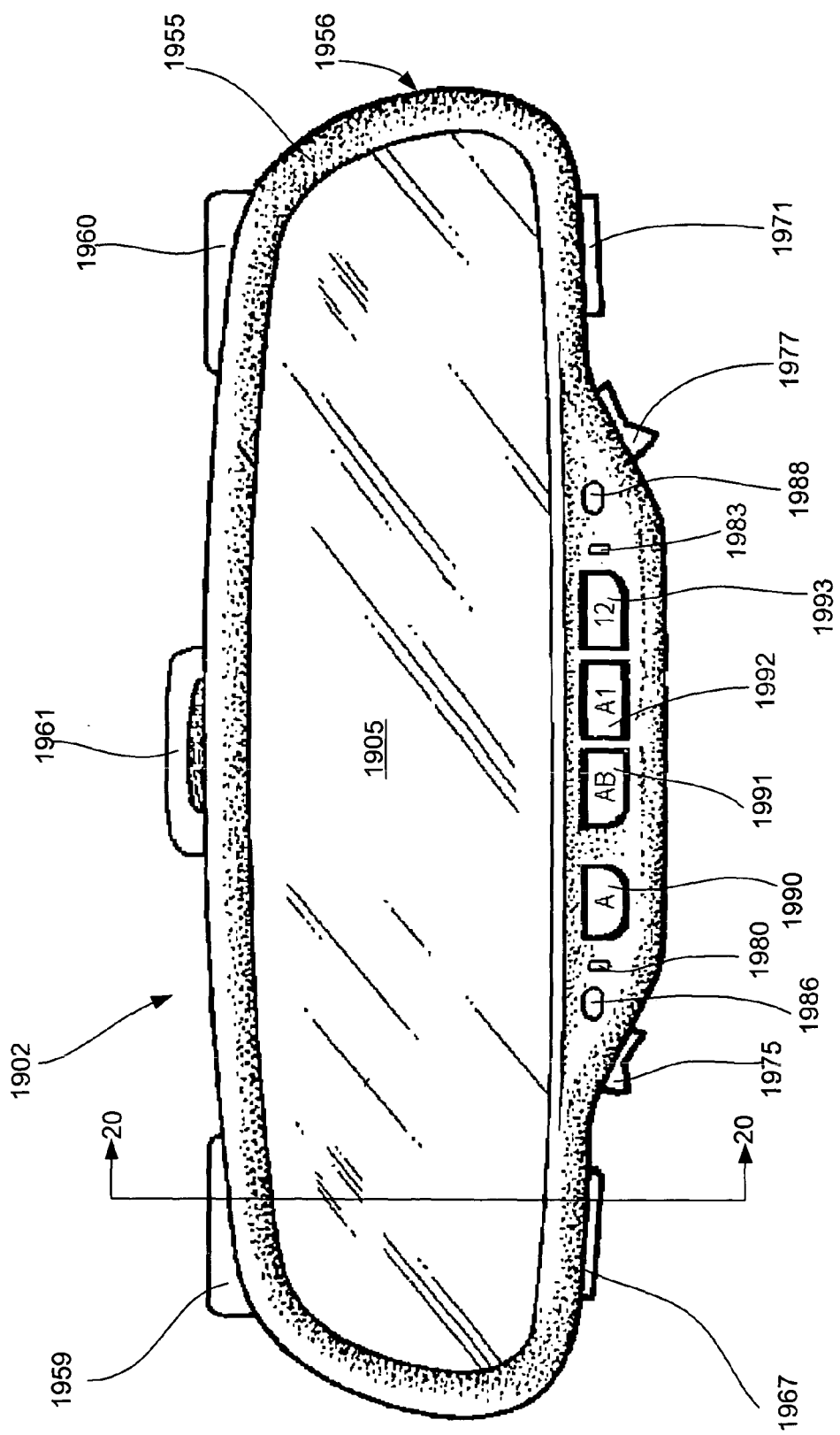
FIG. 19 depicts an interior rearview mirror assembly.

Turning now to FIG. 19, a mirror assembly 1902 is shown to comprise a bezel 1955 and a case 1956. The bezel and the case combine to define the mirror housing for incorporation of features in addition to a reflective element and information displays. Commonly assigned U.S. Pat. No. 6,102,546, D410,607, U.S. Pat. Nos. 6,407,468, 6,420,800, and 6,471, 362, the disclosures of which are incorporated in their entireties herein by reference, describe examples of various bezels, cases and associated button construction that may be used with the present invention.

Figure 20:
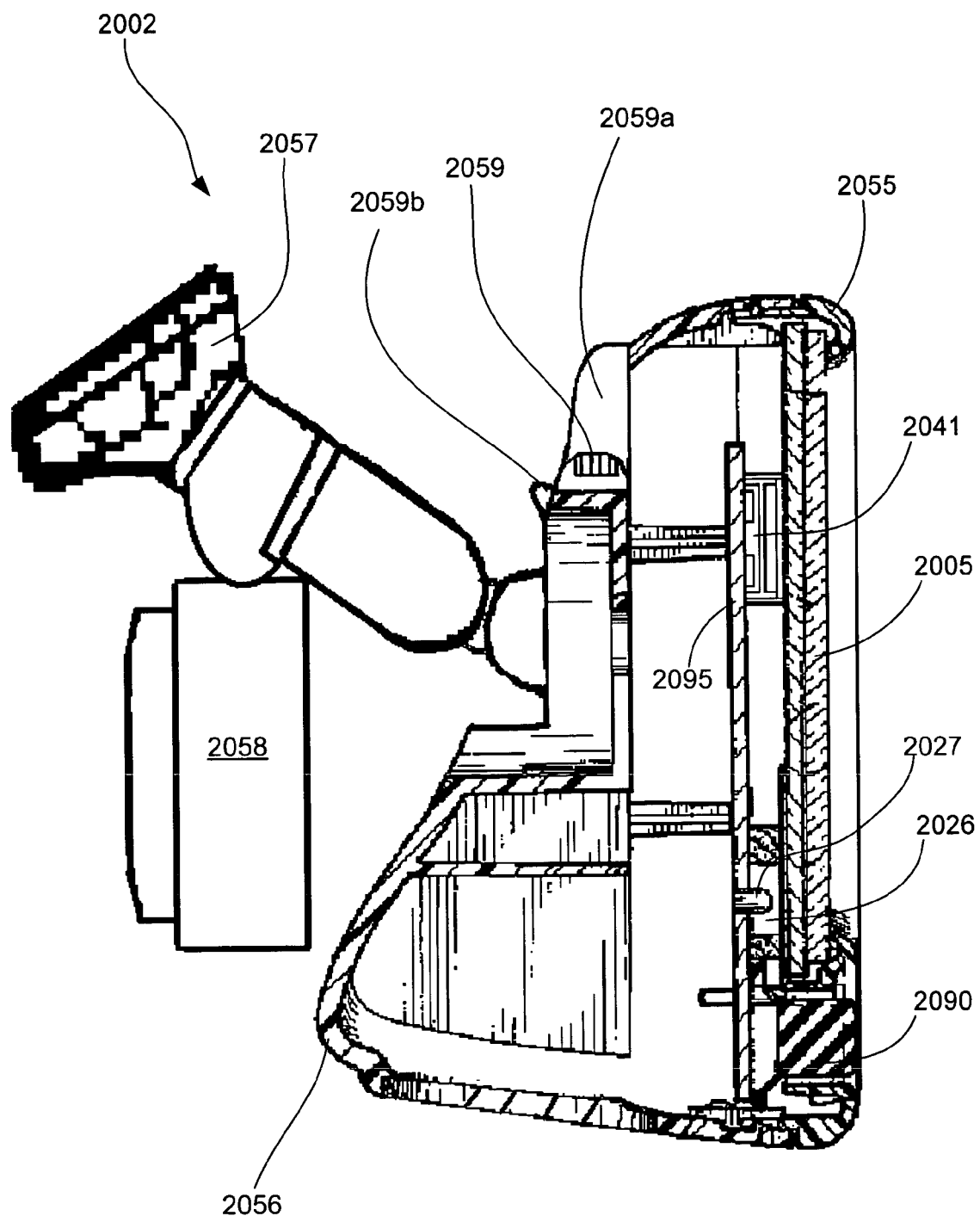
FIG. 20 depicts a sectional view of the mirror assembly of FIG. 19 taken along section line 20-20.
Figure 21:
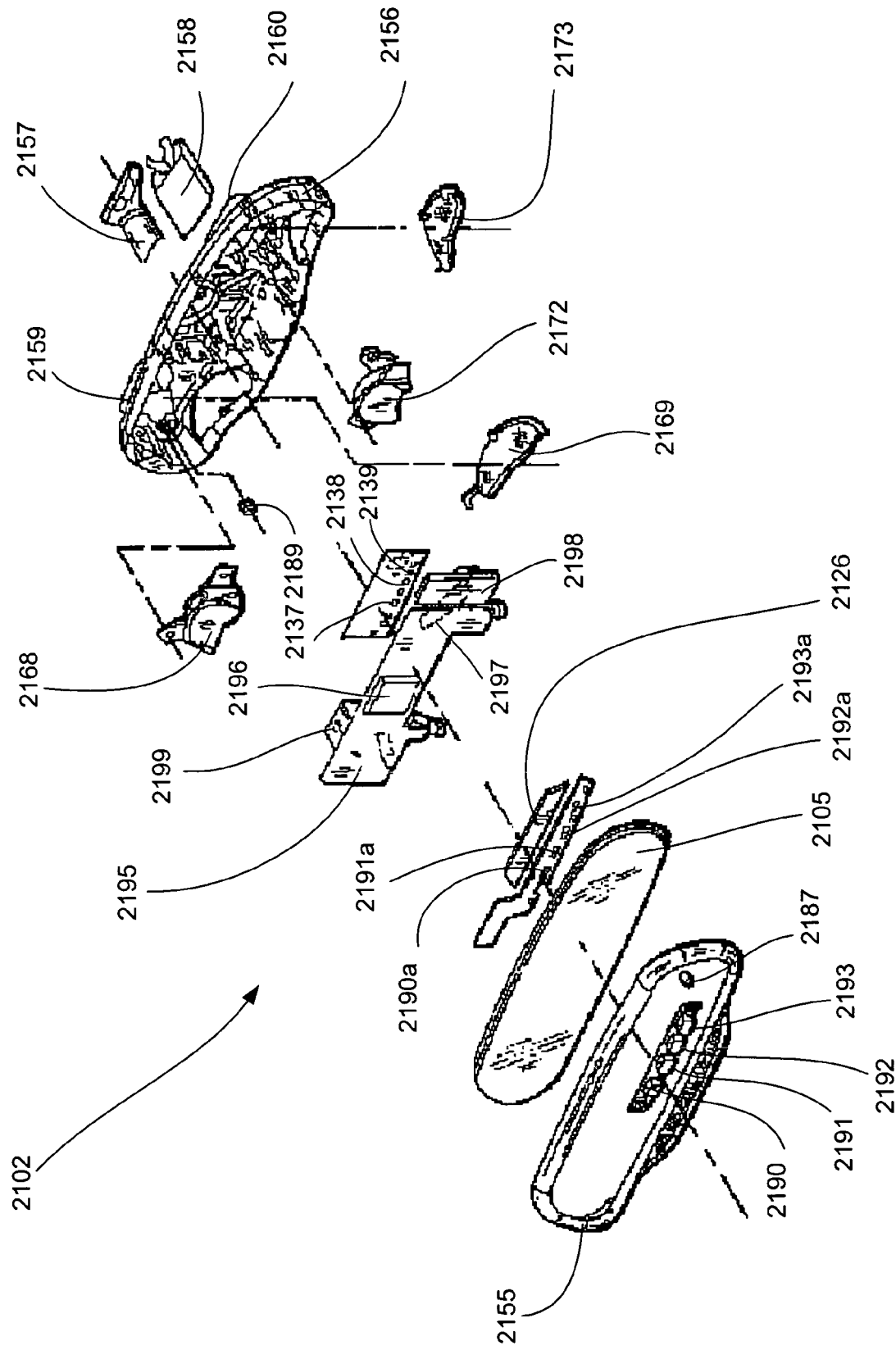
FIG. 21 depicts an exploded view of an interior rearview mirror assembly.

As depicted in FIG. 19, the mirror assembly may comprise first and second microphones 1959, 1960. Examples of microphones for use with the present invention are described in commonly assigned U.S. patent application Ser. Nos. 09/444,176 and 09/724,119, U.S. Patent Application Publication No. US 2002/0110256 A1, and PCT Application No. PCT/US02/32386, the disclosures of which are incorporated in their entireties herein by reference. As depicted in FIGS. 19, 20 and 21, the microphone or microphones may be mounted on the top of the mirror assembly, on the bottom of the mirror assembly, on the backside of the mirror case, or any where within the mirror case or bezel. Preferably, two microphones are incorporated, one near each end, into the mirror assembly on the backside of the mirror case within recessed portion 2059*a* and having an acoustic dam 2059*b* as shown in FIGS. 19, 20 and 21. These systems may be integrated, at least in part, in a common control with information displays and/or may share components with the information displays. In addition, the status of these systems and/or the devices controlled thereby may be displayed on the associated information displays.

With further reference to FIG. 19, mirror assembly 1902 may include first and second illumination assemblies 1967, 1971. Various illumination assemblies and illuminators for use with the present invention are described in commonly assigned U.S. Pat. Nos. 5,803,579, 6,335,548, 6,441,943, 6,521,916, and 6,523,976, as well as, commonly assigned U.S. patent application Ser. Nos. 09/723,675, 10/078,906, and 10/230,804, the disclosures of which are incorporated in their entireties herein by reference. As further depicted in FIG. 21, each illumination assembly preferably comprises a reflector, a lens and an illuminator (not shown). There may be two illumination assemblies generally positioned to illuminate a front passenger seat area and the second generally positioned to illuminate a driver seat area. Alternatively, there may be only one illumination assembly that illuminates both seat areas and/or there may be additional illuminator assemblies such as one to illuminate a center console area, overhead console area or an area between the front seats.

With further reference to FIG. 19, mirror assembly 1902 includes first and second switches 1975, 1977. Suitable switches for use with the present invention are described in detail in commonly assigned U.S. Pat. Nos. 6,407,468, 6,420, 800, 6,426,568, and 6,471,362, as well as, commonly assigned U.S. Patent Application Publication No. US 2002/0024713 A1, the disclosures of which are incorporated in their entireties herein by reference. These switches may be incorporated to control the illumination assemblies, the displays, the mirror reflectivity, a voice activated system, a compass system, a telephone system, a highway toll booth interface, a telemetry system, a headlight controller, a rain sensor, a tire pressure monitoring system, a navigation system, a lane departure warning system, an adaptive cruise control system, etc. Any other display or system described herein or within the references incorporated by reference may be incorporated in any location within the associated vehicle and may be controlled using the switches.

With further reference to FIG. 19, mirror assembly 1902 includes first and second indicators 1980, 1983. Various indicators for use with the present invention are described in commonly assigned U.S. Pat. Nos. 5,803,579, 6,335,548, 6,441,943, 6,521,916, and 6,523,976, as well as, commonly assigned U.S. patent application Ser. Nos. 09/723,675, 10/078,906, and 10/230,804, the disclosures of which are incorporated in their entireties herein by reference. These indicators may indicate the status of the displays, the mirror reflectivity, a voice activated system, a compass system, a telephone system, a highway toll booth interface, a telemetry system, a headlight controller, a rain sensor, a security system, etc. Any other display or system described herein or within the references incorporated by reference may be incorporated in any location within the associated vehicle and may have a status depicted by the indicators.

With further reference to FIG. 19, mirror assembly 1902 may include first and second light sensors 1986, 1988 (glare and ambient sensors 2187, 2189 in FIG. 21). Preferred light sensors for use within the present invention are described in detail in commonly assigned U.S. Pat. Nos. 5,923,027, 6,313,457, 6,359,274, 6,379,013, and 6,402,328, U.S. Patent Application Publication No. US 2002/0056806 A1, and in U.S. patent application Ser. No. 10/068,540, the disclosures of which are incorporated in their entireties herein by reference. The glare sensor and/or ambient sensor automatically control the reflectivity of a self dimming reflective element as well as the intensity of information displays and/or backlighting. The glare sensor is used to sense headlights of trailing vehicles and the ambient sensor is used to detect the ambient lighting conditions that the system is operating within. In another embodiment, a sky sensor may be incorporated positioned to detect light levels generally above and in front of an associated vehicle, the sky sensor may be used to automatically control the reflectivity of a self-dimming element, the exterior lights of a controlled vehicle and/or the intensity of information displays. The mirror assembly may further include sun-load sensors for sensing light levels towards the driver side and passenger side of the vehicle so as to control the climate control system of the vehicle.

With further reference to FIG. 19, mirror assembly 1902 may include first, second, third and fourth operator interfaces 1990, 1991, 1992, 1993 located in mirror bezel 1955. Each operator interface is shown to comprise a backlit information display "A," "AB," "A1" and "12". It should be understood that these operator interfaces can be incorporated any where in the associated vehicle, for example, in the mirror case, accessory module, instrument panel, overhead console, dash board, seats, center console, etc. Suitable switch construction is described in detail in commonly assigned U.S. Pat. Nos. 6,407,468, 6,420,800, 6,426,568, and 6,471,362, as well as, commonly assigned U.S. Patent Application Publication No. US 2002/0024713 A1, the disclosures of which are incorporated in their entireties herein by reference. These operator interfaces may control the illumination assemblies, the displays, the mirror reflectivity, a voice activated system, a compass system, a telephone system, a highway toll booth interface, a telemetry system, a headlight controller, a rain sensor, a tire pressure monitoring system, a navigation system, a lane departure warning system, an adaptive cruise control system, etc. Any other display or system described herein or within the references incorporated by reference may be incorporated in any location within the associated vehicle and may be controlled using an operator interface or interfaces. For example, a user may program a display or displays to depict predetermined information or may program a display or displays to scroll through a series of information, or may enter set points associated with certain operating equipment with associated sensor inputs to display certain information upon the occurrence of a given event. In one embodiment, for example, a given display may be in a non-illuminated state until the engine temperature is above a threshold, the display then automatically is set to display the engine temperature. Another example is that proximity sensors located on the rear of a vehicle may be connected to a controller and combined with a display in a rearview mirror to indicate to a driver the distance to an object; the display may be configured as a bar that has a length proportional to the given distance.

Although specific locations and numbers of these additional features are depicted in FIG. 19, it should be understood that fewer or more individual devices may be incorporated in any location within the associated vehicle and as described within the references incorporated herein.

Turning now to FIG. 20 there is shown a section view of a mirror assembly 2002. The depicted section of FIG. 20 is taken along cut line 20-20 of FIG. 19. FIG. 20 shows a preferred positional relationship of third and fourth information displays 2026, 2041 with respect to reflective element 2005 along with third information display backlighting 2027 within a housing defined by case 2056 and bezel 2055. Mirror assembly 2002 is also shown to comprise a microphone 2059; first operator interface 2090; along with circuit board 2095; mirror mount 2057 and accessory module 2058. The mirror mount 2057 and/or an accessory module 2058 may comprise compass sensors, a camera, a headlight control, an additional microprocessor, a rain sensor, additional information displays, additional operator interfaces, etc.

Turning now to FIG. 21, there is shown an exploded view of a mirror assembly 2102. FIG. 21 provides additional detail with regard to one preferred positional relationship of individual components, as well as, providing additional structural detail of a mirror assembly. Mirror assembly 2102 comprises a reflective element 2105 within a bezel 2155 and a mirror case 2156. A mirror mount 2157 is included for mounting the mirror assembly within a vehicle. It should be understood that a host of accessories may be incorporated into the mount 2157 such as a rain sensor, a camera, a headlight control, an additional microprocessor, additional information displays, compass sensors, etc. These systems may be integrated, at least in part, in a common control with information displays and/or may share components with the information displays. In addition, the status of these systems and/or the devices controlled thereby may be displayed on the associated information displays.

Mirror assembly 2102 is shown in FIG. 21 to further comprise third information display 2126 with third information display backlighting 2137, 2138, 2139; first and second microphones 2159, 2160; a first reflector 2168 with a first lens 2169; a second reflector 2172 with a second lens 2173; a glare sensor 2187; an ambient light sensor 2189; first, second, third and fourth operator interfaces 2190, 2191, 2192, 2193 with first, second, third and fourth operator interface backlighting 2190*a*, 2191*a*, 2192*a*, 2193*a*; a circuit board 2195 having a compass sensor module 2199; and a daughter board 2198 with an input/output bus interface 2197.

The first reflector 2168 combines with the first lens 2169 and a first light source (not shown) to form a first illumination assembly. The second reflector 2172 combines with the second lens 2173 and a second light source (not shown) to form a second illumination assembly. Preferably, the illumination assemblies with associated light source are constructed in accordance with the teachings of commonly assigned U.S. Pat. Nos. 5,803,579, 6,335,548, 6,441,943, 6,521,916, and 6,523,976, as well as, commonly assigned U.S. patent application Ser. Nos. 09/723,675, 10/078,906, and 10/230,804, the disclosures of which are incorporated in their entireties herein by reference.

Preferably, the glare light sensor 2187 and the ambient light sensor 2189 are active light sensors as described in commonly assigned U.S. Pat. Nos. 6,359,274 and 6,402,328, the disclosures of which are incorporated in their entireties herein by reference. The electrical output signal from either, or both, of the sensors 2187, 2189 may be used as inputs to a controller 2196 to control the reflectivity of reflective element 2105 and, or, the intensity of third information display backlighting 2127. The details of various control circuits for use herewith are described in commonly assigned U.S. Pat. Nos. 5,883,605, 5,956,012, 6,084,700, 6,222,177, 6,224,716, 6,247,819, 6,249,369, 6,392,783 and 6,402,328, the disclosures of which are incorporated in their entireties herein by reference. These systems may be integrated, at least in part, in a common control with information displays and/or may share components with the information displays. In addition, the status of these systems and/or the devices controlled thereby may be displayed on the associated information displays.

Although the compass sensor module 2199 is shown to be mounted to circuit board 2195 in FIG. 21, it should be understood that the sensor module may be located within mount 2157, an accessory module 2158 positioned proximate mirror assembly 2102 or at any location within an associated vehicle such as under a dash board, in an overhead console, a center console, a trunk, an engine compartment, etc. Commonly assigned U.S. Pat. Nos. 6,023,229 and 6,140,933, as well as, commonly assigned U.S. patent application Ser. Nos. 09/989,559, 10/210,910 60/360,723, and 60/449,828, the disclosures of which are incorporated in their entireties herein by reference, describe in detail various compass systems for use with the present invention. These systems may be integrated, at least in part, in a common control with information displays and/or may share components with the information displays. In addition, the status of these systems and/or the devices controlled thereby may be displayed on the associated information displays.

Daughter board 2198 is in operational communication with circuit board 2195. Circuit board 2195 may comprise a controller 2196, such as a microprocessor, and daughter board 2198 may comprise an information display (not shown in FIG. 21). The microprocessor may, for example, receive signal(s) from the compass sensor module 2199 and process the signal(s) and transmit signal(s) to the daughter board to control a display to indicate the corresponding vehicle heading. As described herein and within the references incorporated by reference herein, the controller may receive signal(s) from light sensor(s), rain sensor(s) (not shown), automatic vehicle exterior light controller(s) (not shown), microphone(s), global positioning systems (not shown), telecommunication systems (not shown), operator interface(s) and a host of other devices, and control the information display(s) to provide appropriate visual indications.

Controller 2196 (or controllers) may, at least in part, control the mirror reflectivity, exterior lights, rain sensor, compass, information displays, windshield wipers, heater, defroster, defogger, air conditioning, telemetry systems, voice recognition systems such as digital signal processor based voice actuation systems, and vehicle speed. The controller 2196 (or controllers) may receive signals from switches and or sensors associated with any of the devices described herein and in the references incorporated by reference herein to automatically manipulate any other device described herein or described in the references included by reference. The controller 2196 may be, at least in part, located outside the mirror assembly or may comprise a second controller elsewhere in the vehicle or additional controllers throughout the vehicle. The individual processors may be configured to communicate serially, in parallel, via Bluetooth protocol, wireless communication, over the vehicle bus, over a CAN bus or any other suitable communication.

Exterior light control systems as described in commonly assigned U.S. Pat. Nos. 5,990,469, 6,008,486, 6,130,421, 6,130,448, 6,255,639, 6,049,171, 5,837,994, 6,403,942, 6,281,632, 6,291,812, 6,469,739, 6,465,963, 6,429,594, and 6,379,013, U.S. Patent Application Publication No. US 2002/0005472 A1 and U.S. patent application Ser. Nos. 09/528,389, 09/678,586, 09/800,460, 60/404,879, 60/394,583, 10/235,476, and 10/208,142, the disclosures of which are incorporated in their entireties herein by reference, may be incorporated in accordance with the present invention. These systems may be integrated, at least in part, in a common control with information displays and/or may share components with the information displays. In addition, the status of these systems and/or the devices controlled thereby may be displayed on the associated information displays.

Moisture sensors and windshield fog detector systems are described in commonly assigned U.S. Pat. Nos. 5,923,027 and 6,313,457 and U.S. patent application Ser. Nos. 09/970,728 and 09/970,962, the disclosures of which are incorporated in their entireties herein by reference. These systems may be integrated, at least in part, in a common control with information displays and/or may share components with the information displays. In addition, the status of these systems and/or the devices controlled thereby may be displayed on the associated information displays.

Commonly assigned U.S. Pat. No. 6,262,831, the disclosure of which is incorporated herein by reference in its entirety, describes power supplies for use with the present invention. These systems may be integrated, at least in part, in a common control with information displays and/or may share components with the information displays. In addition, the status of these systems and/or the devices controlled thereby may be displayed on the associated information displays.

The mirror assembly may further include one or more antennae for receipt and/or transmission of RF signals. Appropriate receiving, transmitting, and/or processing circuitry may further be included in or attached to the mirror assembly. Such antennae may be used for a cellular telephone system, a BLUETOOTH™ transmitting/receiving system, a remote keyless entry (RKE) system, a trainable garage door opener system, a tire pressure monitoring system, a global positioning satellite system, a LORAN system, etc. Some of these systems may share a common antenna and receiving, transmitting, processing, and display circuits where appropriate. Examples of a tire pressure monitoring system incorporated in a rearview mirror assembly are disclosed in commonly assigned U.S. Pat. Nos. 6,215,389 and 6,431,712 and in U.S. patent application Ser. Nos. 09/359,144 and 09/949,955, the entire disclosures of which are incorporated herein by reference. Examples of a GPS system incorporated in a rearview mirror assembly are disclosed in commonly assigned U.S. Pat. Nos. 6,166,698, 6,297,781, 6,396,446, and in U.S. Patent Published Application No. US 2002/0032510 A1, the entire disclosures of which are incorporated herein by reference. An example of a LORAN system incorporated in a rearview mirror assembly is disclosed in commonly assigned U.S. Patent Application Publication No. US 2002/0193946 A1, the entire disclosure of which is incorporated herein by reference. An example of both telephone/telematics system and a BLUETOOTH™ system incorporated in a rearview mirror assembly is disclosed in commonly assigned U.S. Patent Application No. US 2002/0032510 A1, the entire disclosure of which is incorporated herein by reference. Examples of a trainable garage door opening systems and RKE systems incorporated in a rearview mirror assembly are disclosed in U.S. Pat. No. 6,091,343, the entire disclosures of which are incorporated herein by reference. The mirror may further include an infrared (IR) transmitter/receiver for transmitting/receiving information to and from the mirror assembly and possibly to and from the vehicle. An example of such a rearview mirror assembly is disclosed in commonly-assigned U.S. Pat. No. 6,407,712, the entire disclosure of which is incorporated herein by reference.

The mirror assembly may further include one or more of the same or different types of displays. Examples of different types of displays include vacuum fluorescent, LCD, reverse LCD, LED, organic LED, dot matrix, backlit indicia, etc. For displays intended to simultaneously display significant amounts of information, the display disclosed in commonly-assigned U.S. Pat. No. 6,346,698 may be used. The entire disclosure of which is incorporated herein by reference. Examples of backlit indicia panel displays are disclosed in commonly-assigned U.S. Pat. Nos. 6,170,956 and 6,356,376 and in U.S. patent application Ser. Nos. 09/586,813 and 09/664,151, the entire disclosures of which are incorporated herein by reference. Various displays used in rearview mirrors are disclosed in commonly-assigned U.S. Pat. No. 6,356,376 and in U.S. Patent Application Publication No. US 2002/0154379 A1, the entire disclosures of which are incorporated herein by reference.

The wiring for the vehicle accessories in the rearview mirror assembly housing may be run through the mounting bracket and along the windshield (if the mounting bracket does not already extend to the headliner) under a channel mount. An example of a rearview mirror assembly in which the wiring for accessories in the mirror assembly housing are routed through the mounting bracket is disclosed in commonly-assigned U.S. Pat. No. 6,467,919, the entire disclosure of which is incorporated herein by reference.

While the best modes for carrying out the invention have been described in detail, other possibilities exist within the spirit and scope of the present invention. Those familiar with the art to which this invention relates will recognize various alternative designs and embodiments for practicing the invention as defined by the following claims.

What is claimed is:

1. An automatic vehicular exterior light control, comprising:
   a controller configured to generate at least one exterior light control signal as a function of at least one probability function, wherein said at least one probability function comprises a plurality of variables and a substantially continuous output value having at least three states indicative of a probability; and wherein said variables are selected from the group of controlled vehicle associated operating parameters comprising: vehicle speed, ambient light level, vehicle turn rate, lane tracking, vehicle pitch, vehicle yaw, geographic location and road type.

2. An automatic vehicular exterior light control as in claim 1 wherein said variables are selected from the group of light source characteristics comprising: peak brightness, total brightness, centroid location, gradient, width, height, color, x-direction motion, y-direction motion, brightness change, age, average x-direction motion, average y-direction motion, motion jitter, a change in brightness that correlates to a change in brightness of an exterior light of a controlled vehicle and average brightness change.

3. An automatic vehicular exterior light control as in claim 1 wherein said vehicle turn rate is determined via at least one of the items selected from the group comprising: steering wheel angle, a compass, wheel speed, GPS and image analysis results.

4. An automatic vehicular exterior light control as in claim 1 wherein said controller is further configured to determine whether at least one light source is either a headlight of an oncoming vehicle, a taillight of a leading vehicle or a non-vehicular light source as a function of said probability function.

5. An automatic vehicular exterior light control as in claim 4 wherein said determination is further a function of the brightness of the light source.

6. An automatic vehicular exterior light control as in claim 4 wherein said determination is further a function of any AC flicker that may be present in the light source.

7. An automatic vehicular exterior light control as in claim 1 wherein said probability function is selected from the group comprising: a first order equation, a second order equation, a third order equation and a fourth order equation.

8. An automatic vehicular exterior light control, comprising:
   a controller configured to generate at least one exterior light control signal as a function of at least one probability function, wherein said at least one probability function comprises a plurality of variables, a plurality of weighting factors and an output, wherein said output comprises at least three states; and wherein said variables are selected from the group of controlled vehicle associated operating parameters comprising: vehicle speed, ambient light level, vehicle turn rate, lane tracking, vehicle pitch, vehicle yaw, geographic location and road type.

9. An automatic vehicular exterior light control as in claim 8 wherein said variables are selected from the group of light source characteristics comprising: peak brightness, total brightness, centroid location, gradient, width, height, color, x-direction motion, y-direction motion, brightness change, age, average x-direction motion, average y-direction motion, motion jitter, a change in brightness that correlates to a change in brightness of an exterior light of a controlled vehicle and average brightness change.

10. An automatic vehicular exterior light control as in claim 8 wherein said vehicle turn rate is determined via at least one of the items selected from the group comprising: steering wheel angle, a compass, wheel speed, GPS and image analysis results.

11. An automatic vehicular exterior light control as in claim 10 wherein said controller is further configured to determine whether at least one light source is either a headlight of an oncoming vehicle, a taillight of a leading vehicle or a non-vehicular light source as a function of said probability function.

12. An automatic vehicular exterior light control as in claim 11 wherein said determination is further a function of the brightness of the light source.

13. An automatic vehicular exterior light control as in claim 11 wherein said determination is further a function of any AC flicker that may be present in the light source.

14. An automatic vehicular exterior light control as in claim 8 wherein said at least one output is selected from the group comprising: a Boolean true-false value and a substantially continuous value indicative of a probability.

15. An automatic vehicular exterior light control as in claim 8 wherein said weighting factors are determined experimentally by examining at least one image containing at least one known light source.

16. An automatic vehicular exterior light control as in claim 8 wherein said weighting factors are determined by examining statistical data.

17. An automatic vehicular exterior light control as in claim 16 wherein said statistical data is derived from a plurality of images containing known light sources.

18. An automatic vehicular exterior light control as in claim 8 wherein said probability function is selected from the group comprising: a first order equation, a second order equation, a third order equation and a fourth order equation.

19. An automatic vehicular exterior light control, comprising: a controller configured to generate an exterior light control signal, said controller is further configured to execute a first algorithm comprising at least one second algorithm selected from the group comprising: an on state to off state transition state algorithm and an off state to on state transition state algorithm; wherein said off state to on state transition state is entered when at least one of the conditions is satisfied selected from the group comprising: scene free of headlamps and tail lamps with brightness above a threshold, less than threshold number of AC lights in image, less than threshold number of lights in the image, threshold number of continuous clear cycles reached, controlled vehicle speed above threshold, controlled vehicle steering wheel angle magnitude below threshold value, HOLD timer elapsed. INACTIVITY timer elapsed, TAILLAMP OVERTAKE timer, FOG condition clear, RAIN condition clear, street lamp density below threshold and traffic density delay.

* * * * *

UNITED STATES PATENT AND TRADEMARK OFFICE
CERTIFICATE OF CORRECTION

| | |
|---|---|
| PATENT NO. | : 7,565,006 B2 |
| APPLICATION NO. | : 10/645801 |
| DATED | : July 21, 2009 |
| INVENTOR(S) | : Joseph S. Stam et al. |

It is certified that error appears in the above-identified patent and that said Letters Patent is hereby corrected as shown below:

Column 10, line 45, "in9$s$[0]" should be -- in9s[0] --.

Column 10, line 65, "[a, in 9$s$[8:0]] . . . [b, in 9$s$[8:0]]" should be -- [a, in9s[8:0] . . . [b, in9s[8:0]] --.

Column 11, line 3, "in 9$s$[0]" should be -- in9s[0] --.

Column 11, line 9, "in9$s$[8:0]" should be -- in9s[8:0] --.

Column 11, line 25, "[x, in9$s$[8:0]]" should be -- [x, in9s[8:0]] --.

Column 11, line 30, "in9$s$[8:0]" should be -- in9s[8:0] --.

Column 14, line 42, "considered for example" should be -- considered, for example --.

Column 44, claim 19, line 9, "elapsed." should be -- elapsed, --.

Signed and Sealed this

Ninth Day of February, 2010

David J. Kappos
*Director of the United States Patent and Trademark Office*